United States Patent
Carceroni et al.

(10) Patent No.: US 9,996,109 B2
(45) Date of Patent: Jun. 12, 2018

(54) IDENTIFYING GESTURES USING MOTION DATA

(71) Applicant: Google Inc., Mountain View, CA (US)

(72) Inventors: Rodrigo Carceroni, Mountain View, CA (US); Derya Ozkan, Mountain View, CA (US); Suril Shah, Mountain View, CA (US); Pannag Raghunath Sanketi, Fremont, CA (US)

(73) Assignee: Google LLC, Mountain View, CA (US)

( * ) Notice: Subject to any disclaimer, the term of this patent is extended or adjusted under 35 U.S.C. 154(b) by 28 days.

(21) Appl. No.: 14/826,437

(22) Filed: Aug. 14, 2015

(65) Prior Publication Data

US 2016/0048161 A1    Feb. 18, 2016

Related U.S. Application Data

(60) Provisional application No. 62/038,229, filed on Aug. 16, 2014.

(51) Int. Cl.
*G09G 5/00* (2006.01)
*G06F 1/16* (2006.01)
(Continued)

(52) U.S. Cl.
CPC ............ *G06F 1/163* (2013.01); *G06F 1/3206* (2013.01); *G06F 1/3265* (2013.01); *G06F 3/014* (2013.01);
(Continued)

(58) Field of Classification Search
CPC ........ G06F 1/163; G06F 3/0346; G06F 3/038; G06F 3/014; G06F 1/3265; G06F 1/3206;
(Continued)

(56) References Cited

U.S. PATENT DOCUMENTS 6,151,208 A    11/2000 Bartlett
6,492,981 B1    12/2002 Stork et al.
(Continued)

FOREIGN PATENT DOCUMENTS

EP    2876534 A1    7/2008
EP    2079004 A1    7/2009
(Continued)

OTHER PUBLICATIONS

Chavez, "Get iOS-style lockscreen notifications on Android with Slidelock," Phandroid, Mar. 8, 2014, Retrieved from <http :1 /phandroid. com/20 14/03/08/how-to-get-ios-lock-screen-on-android/>, 6 pp.
(Continued)

*Primary Examiner* — Rodney Amadiz
(74) *Attorney, Agent, or Firm* — Shumaker & Sieffert, P.A.

(57) ABSTRACT

In one example, a method includes determining, by a processor (104) of a wearable computing device (102) and based on motion data generated by a motion sensor (106) of the wearable computing device, one or more strokes. In this example, the method also includes generating, by the processor and based on the motion data, a respective attribute vector for each respective stroke from the one or more strokes and classifying, by the processor and based on the respective attribute vector, each respective stroke from the one or more strokes into at least one category. In this example, the method also includes determining, by the processor and based on a gesture library and the at least one category for each stroke from the one or more strokes, a gesture. In this example, the method also includes performing, by the wearable device and based on the gesture, an action.

20 Claims, 6 Drawing Sheets

(51) Int. Cl.
  *G06F 1/32* (2006.01)
  *G06F 3/01* (2006.01)
  *G06F 3/038* (2013.01)
  *G06F 3/0346* (2013.01)

(52) U.S. Cl.
  CPC .............. *G06F 3/017* (2013.01); *G06F 3/038* (2013.01); *G06F 3/0346* (2013.01); *G06F 2200/1637* (2013.01); *Y02D 10/153* (2018.01)

(58) Field of Classification Search
  CPC ............. G06F 3/017; G06F 2200/1637; Y02D 10/153
  See application file for complete search history.

(56) References Cited

U.S. PATENT DOCUMENTS

| | | | |
|---|---|---|---|
| 6,826,502 | B2 | 11/2004 | Savard |
| 6,874,127 | B2 | 3/2005 | Newell et al. |
| 7,180,502 | B2 | 2/2007 | Marvit et al. |
| 7,184,025 | B2 | 2/2007 | Williams et al. |
| 7,498,951 | B2 | 3/2009 | Wardimon |
| 8,014,733 | B1 | 9/2011 | Gailloux et al. |
| 8,280,732 | B2 | 10/2012 | Richter et al. |
| 8,344,998 | B2 | 1/2013 | Fitzgerald et al. |
| 8,392,007 | B1 | 3/2013 | Izo et al. |
| 8,515,505 | B1 | 8/2013 | Pattikonda |
| 8,560,004 | B1 | 10/2013 | Tsvetkov et al. |
| 8,701,032 | B1 | 4/2014 | Zhai et al. |
| 8,784,271 | B2 | 7/2014 | Brumback et al. |
| 8,819,569 | B2 | 8/2014 | SanGiovanni et al. |
| 8,896,526 | B1 | 11/2014 | Park |
| 9,008,629 | B1 | 4/2015 | Masterman |
| 9,009,516 | B1 | 4/2015 | Gabayan et al. |
| 9,678,658 | B2 | 6/2017 | Zhang et al. |
| 9,804,679 | B2 | 10/2017 | Carceroni et al. |
| 2005/0065728 | A1 | 3/2005 | Yang et al. |
| 2006/0221881 | A1 | 10/2006 | Morisawa |
| 2007/0288157 | A1 | 12/2007 | Peterman |
| 2008/0139331 | A1 | 6/2008 | Jang et al. |
| 2008/0174547 | A1 | 7/2008 | Kanevsky et al. |
| 2008/0192005 | A1 | 8/2008 | Elgoyhen et al. |
| 2008/0255795 | A1 | 10/2008 | Shkolnikov |
| 2008/0291160 | A1 | 11/2008 | Rabin |
| 2009/0102411 | A1 | 4/2009 | Miller et al. |
| 2009/0195497 | A1 | 8/2009 | Fitzgerald et al. |
| 2009/0265671 | A1* | 10/2009 | Sachs .................. G06F 3/017 715/863 |
| 2009/0291759 | A1 | 11/2009 | Cox et al. |
| 2009/0303204 | A1 | 12/2009 | Nasiri et al. |
| 2010/0124949 | A1 | 5/2010 | Demuynck et al. |
| 2010/0138785 | A1 | 6/2010 | Uoi et al. |
| 2010/0235667 | A1 | 9/2010 | Mucignat et al. |
| 2011/0018731 | A1 | 1/2011 | Linsky et al. |
| 2011/0054833 | A1 | 3/2011 | Mucignat |
| 2011/0177802 | A1 | 7/2011 | Gupta |
| 2011/0221974 | A1* | 9/2011 | Stern ................... G06F 3/017 348/734 |
| 2011/0307213 | A1 | 12/2011 | Zhao et al. |
| 2011/0310005 | A1 | 12/2011 | Chen et al. |
| 2012/0016641 | A1 | 1/2012 | Raffa et al. |
| 2012/0020566 | A1 | 1/2012 | Yamanouchi |
| 2012/0235906 | A1 | 9/2012 | Ryoo et al. |
| 2012/0254646 | A1 | 10/2012 | Lin |
| 2012/0272194 | A1 | 10/2012 | Yang et al. |
| 2012/0297226 | A1 | 11/2012 | Mucignat et al. |
| 2013/0189963 | A1 | 7/2013 | Epp et al. |
| 2013/0222270 | A1 | 8/2013 | Winkler et al. |
| 2013/0222271 | A1 | 8/2013 | Alberth et al. |
| 2013/0234924 | A1 | 9/2013 | Janefalkar et al. |
| 2013/0249785 | A1 | 9/2013 | Alameh |
| 2013/0265218 | A1 | 10/2013 | Moscarillo |
| 2013/0300687 | A1 | 11/2013 | Park |
| 2013/0338961 | A1 | 12/2013 | Youssef et al. |
| 2014/0071037 | A1 | 3/2014 | Cohen et al. |
| 2014/0139422 | A1 | 5/2014 | Mistry et al. |
| 2014/0139454 | A1 | 5/2014 | Mistry et al. |
| 2014/0143737 | A1 | 5/2014 | Mistry et al. |
| 2014/0191955 | A1 | 7/2014 | Raffa et al. |
| 2014/0201126 | A1* | 7/2014 | Zadeh .................... G06K 9/627 706/52 |
| 2014/0253429 | A1 | 9/2014 | Dai et al. |
| 2014/0282270 | A1 | 9/2014 | Slonneger |
| 2015/0004944 | A1 | 1/2015 | Steeves et al. |
| 2015/0085621 | A1 | 3/2015 | Hong et al. |
| 2015/0101423 | A1 | 4/2015 | Tuli |
| 2015/0121228 | A1 | 4/2015 | Lee |
| 2015/0186092 | A1 | 7/2015 | Francis et al. |
| 2016/0037482 | A1 | 2/2016 | Higgins et al. |
| 2016/0041620 | A1 | 2/2016 | Motoyama et al. |
| 2016/0041680 | A1 | 2/2016 | Chi et al. |
| 2016/0048161 | A1 | 2/2016 | Carceroni et al. |
| 2016/0085266 | A1 | 3/2016 | Lee et al. |
| 2016/0202665 | A1 | 7/2016 | Park |
| 2016/0299570 | A1 | 10/2016 | Davydov |
| 2016/0320849 | A1 | 11/2016 | Koo |
| 2017/0003747 | A1 | 1/2017 | Carceroni et al. |
| 2017/0031449 | A1 | 2/2017 | Karsten et al. |

FOREIGN PATENT DOCUMENTS

| | | | | |
|---|---|---|---|---|
| EP | 2499552 | A1 | 9/2012 | |
| GB | 2419433 | A * | 4/2006 | ............. G06F 3/014 |
| KR | 20150082079 | A | 7/2015 | |
| WO | 2006120211 | A1 | 11/2006 | |
| WO | 2011057287 | A1 | 5/2011 | |
| WO | 2013057048 | A1 | 4/2013 | |
| WO | 2015060856 | A1 | 4/2015 | |

OTHER PUBLICATIONS

Silver Finger Software, "LockerPro Lockscreen Free," Google Play Apps, Jun. 3, 2014, Retrieved from <https:l/play.google.com/store/apps/details?id=com.productigeeky.lockerprolite>, 3 pp.
Ritchie, "Lock Screen," iMore, Retrieved from <http://www.imore.com/lock-screen-iphone-ipad> on Jul. 7, 2014, 6 pp.
Koo et al, Machine Translation of Foreign Patent Document KR 20150082079 A, Apparatus and method for controlling home device using wearable device, Jul. 15, 2015, 13 pp.
Shah, Casio G-Shock with High Brightness LED Automatically Illuminates the Display When the User Tilts the Walch Toward the Eyes to Check the Time—Fareastgizmos, downloaded from fareastgizmos.com on Jan. 7, 2014, 3 pp.
International Search Report and Written Opinion of International Application No. PCT/US2015/045237, dated Feb. 4, 2016, 19 pp.
International Preliminary Report on Patentability from International Application No. PCT/US2015/045237, dated Mar. 2, 2017, 13 pp.
Communication Pursuant to Rules 161(1) and 162 EPC dated Mar. 23, 2017 from counterpart European Application No. 15754382.8, 2 pp.
Invitation to Pay Additional Fees from International Application No. PCT/US2015/045237, dated Nov. 26, 2015, 7 pp.
Prosecution History from U.S. Appl. No. 14/295,295 from Aug. 28, 2014 through Jan. 13, 2015 37 pp.
Fareastgizmos, Casio G-Shock with High Brightness LED Automatically Illuminates the Display When the User Tilts the Watch Toward the Eyes to Check the Time—Fareastgizmos, 3 pages, downloaded from fareastgizmos.com, downloaded on Jan. 7, 2014, 3 pp.
Introducing the Meteor Your Voice and Gesture-Controlled Smartwatch, Two-Way Voice & Gesture Control Communicator, Kreyos—The Meteor smart watch, downloaded from https://kreyos.com/, downloaded on Jun. 3, 2014, 8 pages.
Shanklin, "Review: Pebble Smartwatch", www.gizmag.com/pebble-watch-review/28990, Sep. 8, 2013, 11 pages, downloaded on Jan. 7, 2014.
Wikipedia, "Covariance," http://en.wikipedia.org/wiki/Covariance, accessed Mar. 13, 2013, 6 pp.
Wikipedia, "Pearson Product-Moment Correlation Coefficient," http://en.wikipedia.org/wiki/Pearson_product-moment_correlation_coefficient, accessed Mar. 13, 2013, 13 pp.

(56) References Cited

OTHER PUBLICATIONS

Wikipedia, "Correlation and Dependance," http://en.wikipedia.org/wiki/Correlation_and_dependence#Pearson.27s_product-moment_coefficient, accessed Mar. 13, 2013, 8 pp.

Jon Fingas, "Android Wear will reportedly let you navigate with a flick of the wrist," Engadget, Retrieved from <http://www.engadget.com/2015/03/10/androidweargestureandwifileak/> Mar. 10, 2015, 19 pp.

Kreyos, "Introducing Meteor, Two-Way Voice & Gesture Control Communicator—Your Phone in Your Pocket," Retrieved from <www.kreyos.com/?utm_source=indiegogo&utm_medium=web&utm_campaign=igg> Jan. 7, 2014, 8 pp.

U.S. Appl. No. 14/791,291 filed by Rodrigo Carceroni on Jul. 3, 2015.

Response to Communication pursuant to Rules 161 and 162 EPC dated Mar. 23, 2017, from counterpart European Application No. 15754382.8, filed Sep. 6, 2017, 10 pp.

Murray, "Integration of Accelerometer Data: Filter Analysis and Design Using Riccati Solutions", IEEE Transactions on Automatic Control, Feb. 1987, 174-76, vol. AC-32 No. 2., 3 pp.

Agrawal et al., "Using Mobile Phones to Write in Air", Proceedings of the 9th Int'l Coni. on Mobile Systems, Applications, and Services (MobiSys 2011 ), Jun. 28, 2011, pp. 1-14.

Flash et al., "The Coordination of Arm Movements: An Experimentally Confirmed Mathematical Model", The J. of Neuroscience, Jul. 1985, 1688-1703, vol. 5 No. 7., 16 pp.

\* cited by examiner

IDENTIFYING GESTURES USING MOTION DATA

RELATED APPLICATION

This application claims the benefit of U.S. Provisional Application No. 62/038,229, filed Aug. 16, 2014, the entire content of which is hereby incorporated by reference.

BACKGROUND

Mobile computing devices allow a user to perform a variety of functions (including various forms of communication and computing) on a portable device that can be used in a wide variety of settings and contexts. For example, some mobile devices are capable of accessing the Internet, executing gaming applications, playing videos and music, as well as providing functionality of a traditional mobile (e.g., cellular) telephone. Some such mobile computing devices can be wearable by a user (e.g., by attachment and/or coupling to the user's body and/or clothing). Because such devices are generally powered by a small rechargeable battery, a persistent challenge in wearable mobile computing device ("wearable computing device") design is increasing the length of time that the wearable computing device may operate without recharging the battery.

One method for increasing the length of time that a wearable computing device may operate without recharging the battery is to reduce the amount of power consumed by one or more components of the wearable computing device. A significant consumer of power in a typical wearable computing device is a presence-sensitive display (included in and/or operatively coupled to the wearable computing device) that detects user input and displays graphical content. One example of a presence-sensitive display may be a touchscreen that is physically integrated within a smartphone, tablet, wearable, or other computing device. While the presence-sensitive display is powered on, the wearable computing device may receive indications of user input that are detected at the presence-sensitive display and output graphical content for display at the presence-sensitive display. Wearable computing devices may include a physical button that, when depressed by a user, causes the computing device to power on and/or power off the presence-sensitive display. To conserve power, some wearable computing devices may also automatically power off the presence-sensitive display after a defined time duration during which the presence-sensitive display does not detect user input.

While various options may exist to power off the presence-sensitive display, fewer options are available to power on a presence-sensitive display. For instance, a user may need to locate and select a physical power button to power on the presence-sensitive display, which requires an additional user input before interacting with the presence-sensitive display. Alternatively, some wearable computing devices may power on the presence-sensitive display in response to a change in motion of the wearable computing device that was previously at rest. However, such techniques may produce false positives that power on the presence-sensitive display when not intended by the user, thereby further exacerbating the amount of battery life consumed by the presence-sensitive display and thus decreasing the overall battery life of the mobile computing device.

BRIEF DESCRIPTION OF DRAWINGS

The details of one or more examples of the disclosure are set forth in the accompanying drawings and the description below. Other features, objects, and advantages will be apparent from the description and drawings, and from the claims.

DETAILED DESCRIPTION

In general, techniques of the disclosure are directed to a wearable computing device that determines a gesture performed by a user of the wearable computing device and performs an action based on the determined gesture. For example, the wearable computing device may transition between power modes in response to determining that the user has performed a gesture to view a display operatively coupled to or included in the wearable computing device. As one example, an application processor and/or a display of a wearable computing device worn on a wrist of a user may be operating in a low-power mode. Responsive to determining, based on motion data generated by a motion sensor of the wearable computing device, that the user has performed a gesture associated with moving the wearable computing device into position in which the user is likely able to view the display, one or more components of the wearable computing device may transition from operating in a lower-power mode to operating in a higher-power mode.

Rather than directly analyzing motion data generated based on motion of the wearable computing device, techniques of the disclosure may enable a wearable computing device to determine whether a user of the wearable computing device has performed a gesture by segmenting the motion data into motion strokes. In some examples, the wearable computing device may utilize the motion strokes as a lexical unit for gesture recognition. For instance, the wearable computing device may generate a respective attribute vector for each of the one or more motion strokes, and classify each respective motion stroke of the one or more motion strokes into at least one category based on the respective attribute vector. Based on training data for one or more different gestures, the wearable computing device may analyze the categorized motion strokes to determine whether the user has performed a particular gesture. Responsive to determining that the user has performed the particular gesture, the wearable computing device may determine an action that corresponds to the particular gesture and perform the action. In this way, as opposed to directly analyzing the motion data, techniques of this disclosure may enable the wearable computing device to more accurately determine whether the user has performed the particular gesture. Where performing the action in response to the particular gesture involves increasing the amount of power consumed by the wearable computing device (e.g., activating one or more components of the wearable computing device), techniques of this disclosure may reduce the overall amount of power consumed by the wearable computing device by reducing the frequency and/or total number of instances in which the presence-sensitive display is powered on prior to performing the action, thereby increasing the relative duration that the wearable computing device may be able to operate without re-charging.

Figure 1:
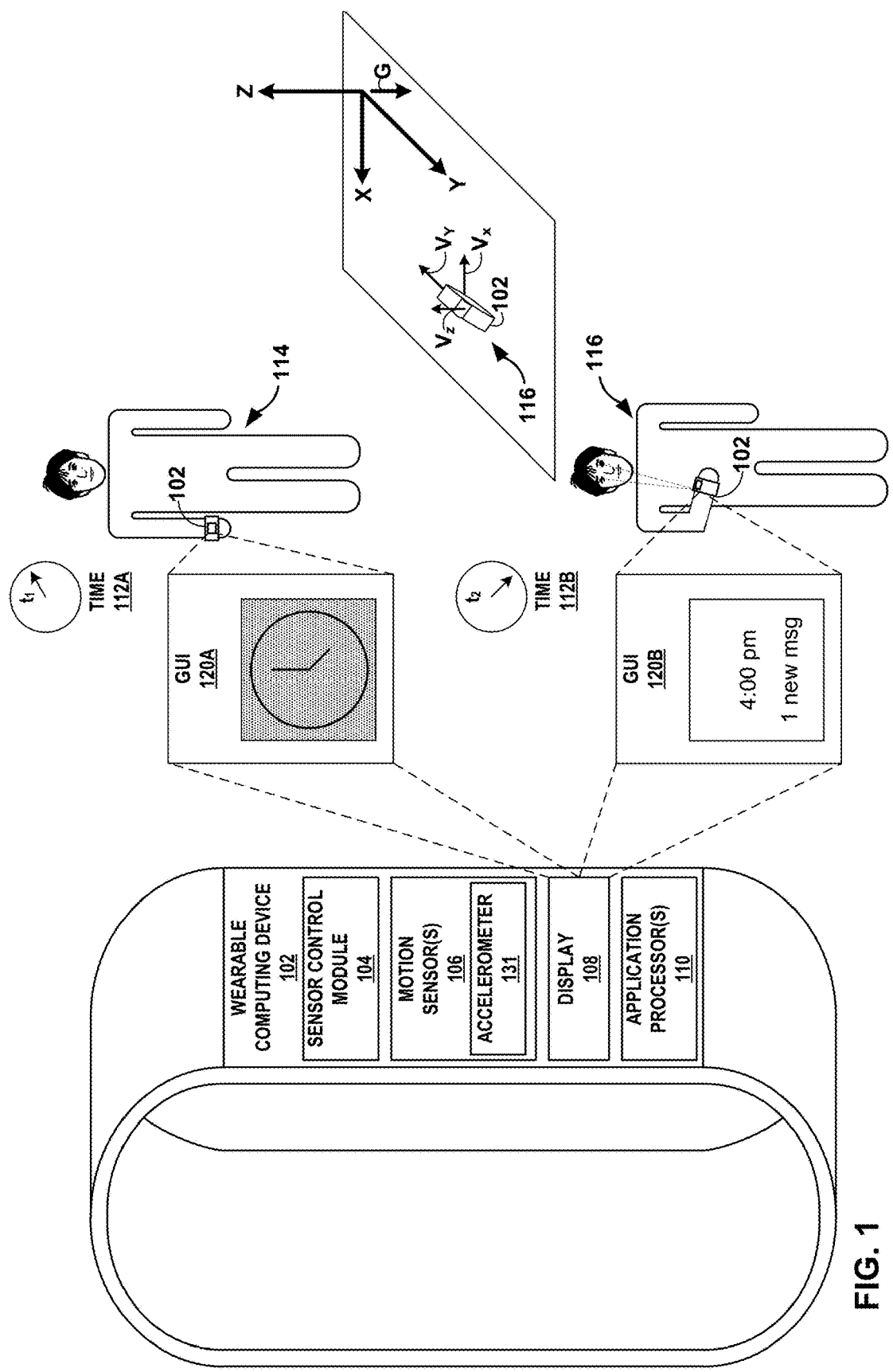
FIG. 1 is a block diagram illustrating an example wearable computing device that performs actions based on motion data, in accordance with one or more techniques of the present disclosure.

FIG. 1 is a block diagram illustrating an example wearable computing device that is configured to detect activity transitions, in accordance with one or more techniques of the present disclosure. As shown in the example of FIG. 1, wearable computing device 102 may include sensor control module 104 ("SCM 104"), one or more motion sensors 106, display 108, and one or more application processors 110.

Wearable computing device 102 may include any number of different portable electronic computing devices, but not limited to, smart watches, smart glasses, headsets, mobile phones (including smartphones), tablet computers, cameras, personal digital assistants (PDAs), etc. Wearable computing device 102 may include various input and output components, including, e.g. one or more processors, memory, telemetry modules, cellular network antennas, a display, one or more UI elements, sensors, and a power source like a rechargeable battery. Further details of one example of wearable computing device 102 are described in FIG. 2. Other examples of wearable computing device 102 that implement techniques of this disclosure may include additional components not shown in FIG. 1.

In some examples, wearable computing device 102 may include SCM 104. SCM 104 may communicate with one or more of motion sensors 106. In some examples, SCM 104 may be referred to as a "sensor hub" that operates as an input/output controller for one or more of motion sensors 106. For example, SCM 104 may exchange data with one or more of motion sensors 106, such as motion data corresponding to wearable computing device 102. SCM 104 may also communicate with application processors 110. In some examples, SCM 104 may use less power than application processors 110. As one example, in operation, SCM 104 may use power in a range of 20-200 mW. In some examples, SCM 104 may be referred to as a digital signal processor (DSP) or advanced DSP (ADSP) that operates as an input/output controller for one or more of motion sensors 106. In some of such examples, wearable computing device 4 may also include a sensor hub (that may be separate from SCM 104) which may operate as an input/output controller for one or more of motion sensors 106. In some examples, the one or more of motion sensors 106 on which the sensor hub operates as the input/output controller may include one or more sensors different than those sensors of motion sensors 106 controlled by SCM 104. For instance, the sensor hub may operate as an input/output controller for a gyroscope of motion sensors 106 where the gyroscope is not controlled by SCM 104. In some examples, the sensor hub may use more power than SCM 104.

SCM 104 may analyze motion data received from one or more of motion sensors 106. For instance, SCM 104 may analyze the motion data to determine whether or not a user of wearable computing device 102 has performed a particular gesture of a plurality of gestures. Responsive to determining that the user of wearable computing device 102 has performed a particular gesture of a plurality of gestures, SCM 104 may cause perform an action corresponding to the particular gesture. As one example, responsive to determining that the user of wearable computing device 102 has performed (or is performing) a gesture to view a display of wearable computing device 102, SCM 104 may cause application processors 110 and/or display 108 to transition from a low-power mode to a relatively higher-power mode.

In some examples, wearable computing device 102 may include one or more motion sensors 106. One or more of motion sensors 106 may measure one more measurands. Examples of one or more of motion sensors 106 may include an accelerometer, a gyroscope, or a proximity sensor. For instance, as illustrated in FIG. 1, motion sensors 106 may include accelerometer 131.

In some examples, wearable computing device 102 may include display 108. Display 108 may output content, such as a graphical user interface (GUI) for display. In some examples, display 108 can include a display component and/or a presence-sensitive input component. In some examples, the presence-sensitive input component and the display component may be integrated into a presence-sensitive display, which displays the GUI and receives input from the user using capacitive, inductive, surface acoustic wave, and/or optical detection at or near the presence sensitive display. That is, display 108, in some examples may be a presence-sensitive display. In other examples, the display device can be physically separate from a presence-sensitive device included in wearable computing device 102.

In some examples, wearable computing device 102 may include one or more application processors 110. One or more application processors 110 may implement functionality and/or execute instructions within wearable computing device 102. These instructions executed by application processors 110 may cause wearable computing device 102 to read/write/etc. information during program execution. Examples of one or more of application processors 110 may include one or more microprocessors, digital signal processors (DSPs), application specific integrated circuits (ASICs), field programmable gate arrays (FPGAs), or any other equivalent integrated or discrete logic circuitry, as well as any combinations of such components.

Rather than requiring a user of wearable computing device 102 to provide additional input to cause wearable computing device 102 to perform an action, techniques of this disclosure may enable wearable computing device 102 to perform an action corresponding to a particular gesture in response to determining that the user of wearable computing device 102 has performed the particular gesture. For instance, SCM 104 of wearable computing device 102 may determine that the user has performed the particular gesture based on motion data generated by a motion sensor of motion sensors 106.

In accordance with one or more techniques of this disclosure, SCM 104 may determine whether the user performed a gesture of a plurality of gestures based on one or more motion strokes determined based on motion data that represents movement of wearable computing device 102. In some examples, SCM 104 may determine the one or more motion strokes based on motion data generated by a motion sensor of motion sensors 106. For instance, SCM 104 may segment the motion data into the one or more motion strokes based on features of the motion data such that each of the one or more motion strokes satisfies one or more conditions.

In any case, SCM 104 may generate a respective attribute vector for each respective stroke of the one or more motion strokes. Some example attributes which may be included in each respective attribute vector include, but are not limited to, spatial attributes (e.g., coordinates of the endpoints of the stroke, distance traversed by the stroke, directionality of the stroke), temporal attributes (e.g., duration of the stroke, start time of the stroke, end time of the stroke), and relational attributes (e.g., whether other motion strokes with similar attributes are present).

Based on the respective attribute vectors, SCM 104 may classify each respective stroke from the one or more motion strokes into at least one category. For instance, SCM 104 may classify each respective stroke as a "tilt" stroke or a "non-tilt" stroke.

SCM 104 may determine whether the one or more motion strokes correspond to a known gesture. For instance, SCM 104 may compare the one or more categories of the respective motion strokes to a gesture library to determine whether the one or more motion strokes correspond to a gesture described by the gesture library. Responsive to determining that the one or more motion strokes correspond to a particular gesture described by the gesture library, SCM 104 may perform an action corresponding to the particular gesture. In this way, as opposed to directly analyzing motion data, SCM 104 may determine whether or not a user of wearable computing device 102 performed a particular gesture based on motion strokes.

The following specific example describes techniques for determining whether a user of wearable computing device 102 performed a gesture to view a display of wearable computing device 102 (i.e., a lift-and-look gesture). However, the techniques of this disclosure are not limited to such a gesture. For instance, the techniques of this disclosure may enable a wearable computing device to determine that the user of the wearable computing device has performed a gesture to answer a call (e.g., by lifting the wearable computing device to their ear), a gesture to ignore a call (e.g., by waiting the wearable computing device from side to side), a volume-up gesture (e.g., by pumping their first in the air), and the like.

In accordance with one or more techniques of this disclosure, wearable computing device 102 may determine whether a user of wearable computing device 102 performed a gesture to view a display of wearable computing device 102 (e.g., display 108). At first time 112A, wearable computing device 102 may be in a first orientation. As illustrated by FIG. 1, wearable computing device 102 may be in first orientation 114 in which wearable computing device 102 may be at the user's side. For instance, in first orientation 114, $V_z$ and $V_y$ may be perpendicular to gravity vector G, and $V_x$ may be parallel to gravity vector G such that a plane on display 108 is parallel to the X-Z plane. In some examples, first orientation 114 may be different than as illustrated in FIG. 1. For instance, the plane on display 108 may be parallel to the Y-X plane, such as where the user is driving. Additionally, at first time 112A, wearable computing device 102 may be in a low-power mode in which one or more components of wearable computing device 102 may be off, deactivated, sleeping, have limited functionality, etc. For instance, at first time 112A, display 108 and application processors 110 may operating in a low-power mode. As illustrated in the example of FIG. 1, display 108 may output GUI 120A which may be dimmed to conserve power. In this way, wearable computing device 102 may consume a reduced amount of power in the low-power mode when compared to a high-powered operating state (e.g., with display 108 and application processors 110 being fully powered).

SCM 104 may determine receive motion data generated by a motion sensor of motion sensors 106. For instance, where the motion sensor of motion sensors 106 is a three-axis accelerometer 131, SCM 104 may receive the motion data in the form of a plurality of acceleration vectors each having a respective $V_x$ value corresponding to the acceleration in the X axis, a respective $V_y$ value corresponding to the acceleration in the Y axis, and a respective $V_z$ value corresponding to the acceleration in the Z axis. For instance, where wearable computing device 102 is at rest in orientation 114, SCM 104 may receive an acceleration vector of approximately (+9.81, 0, 0).

In any case, a user may attempt to use wearable computing device 102 by, for example, moving his/her arm/wrist in an attempt to view display 108 of wearable computing device 102. For instance, the user may move wearable computing device 102 from a first (e.g., orientation 114) to a second orientation (e.g., orientation 116 by moving his/her arm/wrist. The motion sensors of motion sensors 106 may detect the user's movement and SCM 104 may determine a plurality of motion vectors based on the motion data generated by the motion sensors in response to detecting the user's movement.

To determine whether or not the user has performed a gesture to view a display of wearable computing device 102, SCM 104 may determine one or more motion strokes based the received motion data. In some examples, SCM 104 may determine the one or more motion strokes by segmenting the received motion data based on features of the motion data. For instance, SCM 104 may determine a start point for a particular stroke as a local minimum in the received motion data and an end point for the particular stroke as a point in the received motion data having a high rate of change (e.g., 0.05 units in accelerometer data per 10 sequential samples). In the example of FIG. 1, SCM 104 may determine a single stroke that corresponds to the motion data generated by the motion sensor of motion sensors 106 as wearable computing device 102 transition from first orientation 114 to second orientation 116. In some examples, SCM 104 may filter the received motion data prior to determining the one or more motion strokes. For instance, SCM 104 may determine the one or more motion strokes based on low-pass filtered motion data.

SCM 104 may generate a respective attribute vector for each respective stroke of the one or more motion strokes. For instance, in the example of FIG. 1, SCM 104 may determine, for the single stroke, a respective attribute vector that indicates one or more of: coordinates that correspond to the orientation of wearable computing device at first orientation 114, coordinates that correspond to the orientation of wearable computing device at second orientation 116, directionality of the single stroke, a distance traversed by the single stroke, and a temporal duration of the single stroke.

SCM 104 may classify each respective stroke from the one or more motion strokes into at least one category. For instance, in the example of FIG. 1, SCM 104 may classify the single stroke as a "tilt" stroke by comparing the attribute vector corresponding to the single stroke to training data based on attribute vectors that are known to correspond to "tilt" motion strokes.

SCM 104 may determine whether the one or more motion strokes correspond to a gesture by comparing the categories of the one or more motion strokes to a gesture library. In the example of FIG. 1, the gesture library may indicate that a gesture to view a display of a wearable computing device is defined by a single "tilt" stroke. As SCM 104 classified the single stroke as a "tilt" stroke, SCM 104 may determine that the user of wearable computing device 102 has performed a gesture to view a display of wearable computing device 102 and perform a corresponding action. In the example of FIG. 1, responsive to determining that the user of wearable computing device 102 has performed the gesture to view the display of wearable computing device 102, SCM 104 may output a signal to one or more other components of wearable computing device 102 that causes application processor 110 and/or display 108 to transition from operation in a low-power mode to operation in a higher-power mode. In this example of FIG. 1, upon transitioning into the higher-power operating mode, display 108 may output GUI 120B at a higher brightness than GUI 120A. In this way, as opposed to requiring that the user of wearable computing device 102 provide additional input, techniques of this display may enable wearable computing device 102 to activate a display in response to determining that the user is attempting to view the display of wearable computing device 102.

Figure 2:
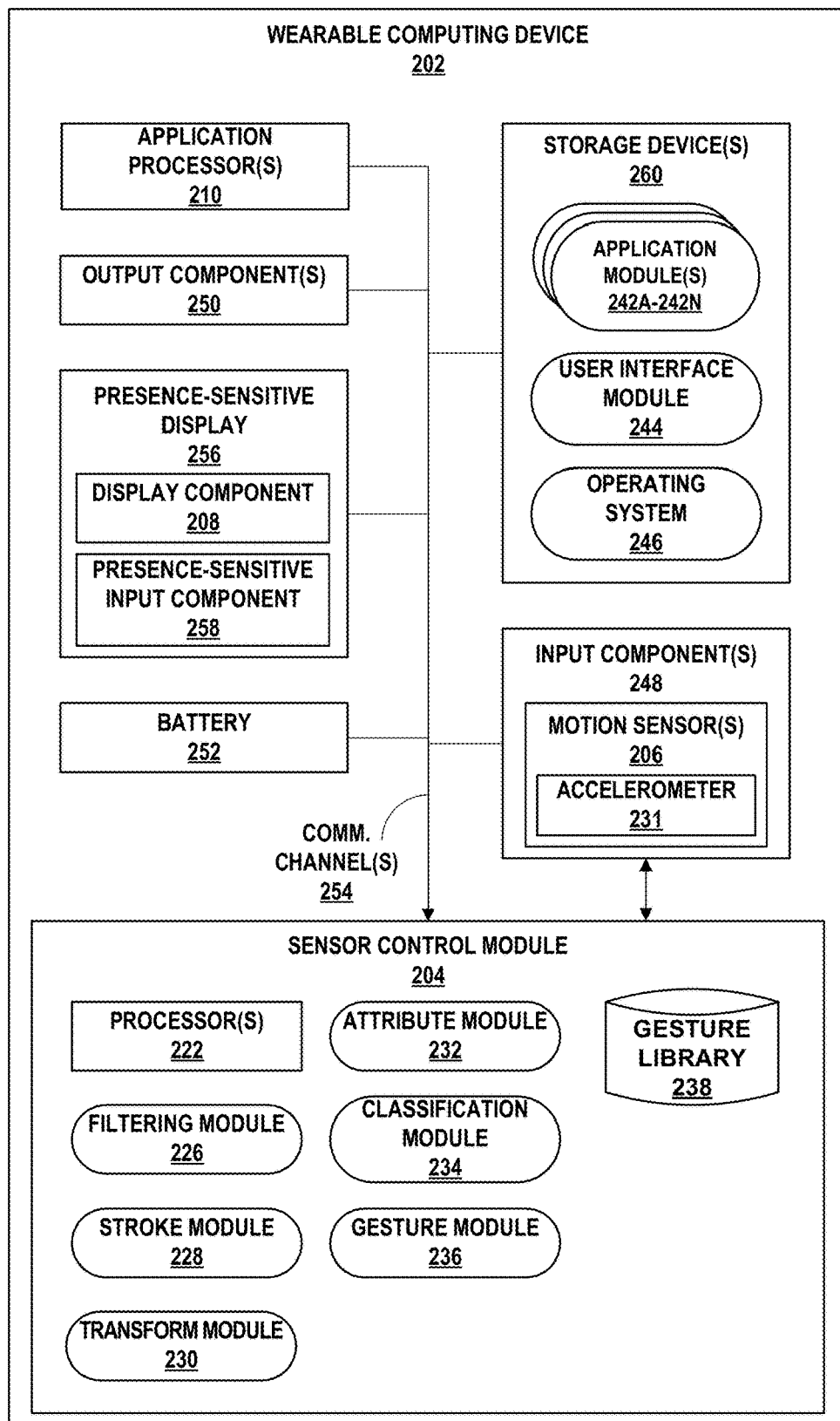
FIG. 2 is a block diagram illustrating an example wearable computing device, in accordance with one or more techniques of the present disclosure.

FIG. 2 is a block diagram illustrating an example computing device, in accordance with one or more techniques of the present disclosure. FIG. 2 illustrates one particular example of wearable computing device 202, and many other examples of wearable computing device 202 may be used in other instances and may include a subset of the components included in example wearable computing device 202 or may include additional components not shown in FIG. 2.

As shown in the example of FIG. 2, wearable computing device 202 includes one or more application processors 210, one or more output components 250, presence-sensitive display 256, battery 252, sensor control module 204 ("SCM 204"), one or more storage devices 260, and one or more input components 248. Storage devices 260 of wearable computing device 202 may also include application modules 242A-242N (collectively, "application modules 242"), user interface module 244 ("UIM 244") and operating system 246. Wearable computing device 202 can include additional components that, for clarity, are not shown in FIG. 2. For example, wearable computing device 202 can include a communication unit to enable wearable computing device 202 to communicate with other devices. Similarly, the components of wearable computing device 202 shown in FIG. 2 may not be necessary in every example of wearable computing device 202. For example, in some configurations, wearable computing device 202 may not include output components 250.

Communication channels 254 may interconnect each of the components 204, 210, 248, 250, 252, 546, and 260 for inter-component communications (physically, communicatively, and/or operatively). In some examples, communication channels 254 may include a system bus, a network connection, an inter-process communication data structure, or any other method and/or structure for communicating data.

One or more application processors 210 may implement functionality and/or execute instructions within wearable computing device 202. For example, application processors 210 on wearable computing device 202 may receive and execute instructions stored by storage devices 260 that execute the functionality of modules 242, 244, and 246. These instructions executed by application processors 210 may cause wearable computing device 202 to read/write/etc. information, such as one or more data files stored within storage devices 260 during program execution. Application processors 210 may execute instructions of modules 242, 244, and 246 to cause presence-sensitive display 256 to output one or more graphical indications of incoming communications for display at presence-sensitive display 256 as content of a user interface. That is, application modules 242, UIM 244, and operating system 246 may be operable by application processors 210 to perform various actions or functions of wearable computing device 202, for instance, causing presence-sensitive display 256 to a present a graphical user interface at display component 208 of presence-sensitive display 256.

One or more input components 248 of wearable computing device 102 may receive input. Examples of input are tactile, audio, and video input. One or more of input devices 44 of wearable computing device 4, in one example, may include a presence-sensitive display, touch-sensitive screen, mouse, keyboard, voice responsive system, video camera, microphone, or any other type of device for detecting input from a human or machine.

As illustrated in FIG. 2, in some examples, input components 248 may include one or more motion sensors 206, which may be configured to perform operations similar to motion sensors 106 of FIG. 1. For instance, motion sensors 206 may generate motion data, such as a sequence of motion vectors, that indicates movement (e.g., data representing movement) associated with wearable computing device 202.

In some examples, in addition to motion sensors 206, input components 248 may include one or more other sensors, such as one or more location sensors (e.g., a global positioning system (GPS) sensor, an indoor positioning sensor, or the like), one or more light sensors, one or more temperature sensors, one or more pressure (or grip) sensors, one or more physical switches, one or more proximity sensors, and one or more bio-sensors that can measure properties of the skin/blood, such as oxygen saturation, pulse, alcohol, blood sugar etc.

In some examples, one or more of input components 248 may include one or more processors. For instance, one or more of input components 248, such as one or more of motion sensors 206, may include one or more microprocessors, digital signal processors (DSPs), application specific integrated circuits (ASICs), field programmable gate arrays (FPGAs), or any other equivalent integrated or discrete logic circuitry, as well as any combinations of such components. In some examples, one or more of input components 248 may include one or more storage devices configured to store measurements. In some examples, the one or more storage devices included in one or more of input components 248 may be similar to storage devices 260 as described herein. For instance, an accelerometer 231 of the one or more motion sensors 206 may include a register, such as a first-in-first-out (FIFO) register, configured to store a quantity of measurements (e.g., 10, 100, 1000, 10000, etc.) of accelerative force over one or more axes (e.g., one-axis, two-axis, or three-axis).

One or more output components 250 of wearable computing device 202 may generate output. Examples of output are tactile, audio, and video output. Output components 250, in one example, includes a presence-sensitive display, sound card, video graphics adapter card, speaker, electronic display, or any other type of device for generating output to a human or machine. The electronic display may be an LCD or OLED part of a touch screen, may be a non-touchscreen direct view display component such as a CRT, LED, LCD, or OLED. The display component may also be a projector instead of a direct view display.

Presence-sensitive display 256 of wearable computing device 202 includes display component 208 and presence-sensitive input component 258. Display component 208 may be a screen at which information is displayed by presence-sensitive display 256 and presence-sensitive input component 258 may detect an object at and/or near display component 208. As one example range, a presence-sensitive input component 258 may detect an object, such as a finger or stylus that is within 2 inches (~5.08 centimeters) or less from display component 208. Presence-sensitive input component 258 may determine a location (e.g., an (x,y) coordinate) of display component 208 at which the object was detected. In another example range, presence-sensitive input component 258 may detect an object 6 inches (~15.24 centimeters) or less from display component 208 and other exemplary ranges are also possible. Presence-sensitive input component 258 may determine the location of display component 208 selected by a user's finger using capacitive, inductive, and/or optical recognition techniques. In some examples, presence sensitive input component 258 also provides output to a user using tactile, audio, or video stimuli as described with respect to display component 208. In the example of FIG. 2, presence-sensitive display 256 presents a user interface (such as user interface 120A or user interface 120B of FIG. 1).

While illustrated as an internal component of wearable computing device 202, presence-sensitive display 256 may also represent and external component that shares a data path with wearable computing device 202 for transmitting and/or receiving input and output. For instance, in one example, presence-sensitive display 256 represents a built-in component of wearable computing device 202 located within and physically connected to the external packaging of wearable computing device 202 (e.g., a screen on a mobile phone). In another example, presence-sensitive display 256 represents an external component of wearable computing device 202 located outside and physically separated from the packaging of wearable computing device 202 (e.g., a monitor, a projector, etc. that shares a wired and/or wireless data path with a tablet computer).

SCM 204 may collect and analyze sensor data. For instance, SCM 204 may collect any analyze sensor data from one or more of motion sensors 206 (e.g., accelerometer 231). As illustrated in FIG. 2, SCM 204 may include one or more processors 222, filtering module 226, stroke module 228, transform module 230, attribute module 232, classification module 234, gesture module 236, and gesture library 238. In some examples, SCM 204 may be a discrete component within wearable computing device 202. In some examples, SCM 204 may be integrated into one or more other components of wearable computing device 202, such as one or more of application processors 210. In some examples, SCM 204 may include additional components that, for simplicity, are not shown in FIG. 2. For instance, SCM 204 may include one or more analog-to-digital converters which may facilitate communication between one or more of input components 248 and one or more of processors 222. Additionally, SCM 204 may include one or more storage devices which may store filtering module 226, stroke module 228, transform module 230, attribute module 232, classification module 234 gesture module 236, and gesture library 238. In some examples, the one or more storage devices included in SCM 204 may be similar to storage devices 260 as described below.

Processors 222 may implement functionality and/or execute instructions within SCM 204. For example, one or more of processors 222 may receive and execute instructions stored by a storage device that execute the functionality of filtering module 226, stroke module 228, transform module 230, attribute module 232, classification module 234, and/or gesture module 236. These instructions executed by one or more of processors 222 may cause SCM 204 to read/write/ etc. information, such as one or more data files stored within a storage device during program execution.

Filtering module 226 may be executable by one or more of processors 222 to filter sensor data measured by one or more of motion sensors 206. For instance, filtering module 226 may filter a sequence of motion vectors received from an accelerometer 231 of one or more motion sensors 206. In some examples, the motion vectors may represent a combination of different forces. For instance, the motion vectors may represent both the (a) gravity force that may register as low-frequency components, which varies with the 3D orientation of wearable computing device 202, and (b) impulses applied to wearable computing device 202 that may register as high-frequency components (i.e., as the user moves his or her arm). As such, in some examples, filtering module 226 may filter the sequence of motion vectors by separating the low frequency components from the high frequency components (e.g., using symmetric kernels). Filtering module 226 may output the low frequency components to one or more components of wearable computing device 202, such as stroke module 228 and/or transform module 230, as filtered motion vectors.

Stroke module 228 may be executable by one or more of processors 222 to determine one or more motion strokes based on motion data. For instance, stroke module 228 may determine the one or more motion strokes based on a sequence of filtered motion vectors received from filtering module 226. In some examples, stroke module 228 may determine the one or more motion strokes using the filtered motion vectors in the original coordinate system. In some examples, stroke module 228 may determine the one or more motion strokes using filtered motion vectors converted into a task-specific coordinate system as described below. In any case, stroke module 228 may output an indication of the determined motion strokes to one or more components of wearable computing device 202, such as attribute module 232.

In some examples, stroke module 228 may determine motion strokes as movements of wearable computing device 202 that satisfy one or more conditions. As one example, a stroke may be temporally compact such that the duration of the stroke is less than a pre-defined maximum stroke duration (e.g., 1 second, 2, seconds, 5 seconds, 10 seconds). As another example, a stroke may have a non-trivial orientation change such that the distance, such as the geodesic distance, between the first orientation of the stroke and the last orientation of the stroke is greater than a pre-defined minimum change in orientation (e.g., 0.001 on a scale of 0 to 2, 0.1, etc.). As another example, a stroke may be monotonic such that the distance from the first orientation of the stroke and the last orientation of the stroke increases monotonically along the entire stroke. For instance, for every pair of motion vectors in a stroke (i.e., $(m\_i, m\_j)$) such that $j>i$, the following may be true: $d(m\_j, m\_0) > d(m\_i, m\_0)$, where $m\_0$ is the motion vector corresponding to the starting boundary of the stroke, and $d(m\_i, m\_0)$ is the distance between motion vector i and motion vector 0. When transformed into the task-specific coordinate system (i.e., by transform module 230), the norm of (u,v) may vary monotonically along the duration of the stroke. As another example, a stroke may be approximately geodesic such that the stroke happens along a geodesic of the orientation space. For instance, a meaningful stroke may happen along a Meridian defined by the task-specific coordinate system.

Transform module 230 may be executable by one or more of processors 222 to transform motion data between different coordinate systems. For instance, transform module 230 may convert filtered motion vectors received from filtering module 226 from a first coordinate system to a second coordinate system. In some examples, the first coordinate system may define the orientation of wearable computing device 202 relative to the gravity vector and the second coordinate system may define the orientation of wearable computing device 202 relative to a task-specific orientation. For instance, the second coordinate system may utilize the orientation of wearable computing device 202 at the end of a look-and-lift gesture (i.e., the orientation of wearable computing device 202 during user interactions) as the task-specific orientation. In any case, transform module 230 may output the converted motion vectors to one or more other components of wearable computing device 202, such as attribute module 232.

Attribute module 232 may be executable by one or more of processors 222 to generate an attribute vector for a stroke. For instance, attribute module 232 may generate a respective attribute vector for each respective stroke from the one or more motion strokes received from stroke module 228. Some example attributes which may be included in each respective attribute vector include, but are not limited to, spatial attributes, temporal attributes, and relational attributes. Attribute module 232 may output the attribute vectors to one or more other components of wearable computing device 202, such as classification module 234.

In some examples, attribute module 232 may generate the attribute vectors based on a history of measurements collected from the current user of wearable computing device 202, a history of measurements collected from other users of wearable computing device 202, a history of measurements collected from users of other wearable computing devices, or any combination of the same. In situations in which wearable computing device 202 discussed herein may collect personal information about users, or may make use of personal information, the users may be provided with an opportunity to control whether programs or features collect user information (e.g., information about a user's social network, social actions or activities, profession, a user's preferences, a user's current location, a user's motion strokes, or a user's motion measurements), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Classification module 234 may be executable by one or more of processors 222 to classify motion strokes into at least one category. For instance, classification module 234 may classify each respective stroke from the one or more motion strokes received from stroke module 228 into at least one category based on respective corresponding attribute vectors received from attribute module 232. Classification module 234 may output the respective categories for the respective motion strokes to one or more other components of wearable computing device 202, such as gesture module 236. In this way, classification module 234 may use the strokes as lexical units for gesture recognition.

Gesture module 236 may be executable by one or more of processors 222 to determine whether or not a user associated with wearable computing device 202 has performed (or is performing) a gesture. In some examples, gesture module 236 may determine whether the user has performed a gesture based on the respective categories for the respective one or more motion strokes and a gesture library, such as gesture library 238. In some examples, some entries in gesture library 238 may correspond to a single stroke. In some examples, gesture module 236 may accommodate uncertainty in the recognition of individual motion strokes. For instance, gesture module 236 may implement one or more of Hidden Markov Models (HMMs), particle filters, and/or similar multimodal temporal estimation techniques when determining whether or not the user has performed a gesture.

Gesture library 238 may include one or more entries that may each correspond to a particular gesture. As one example, a first entry in gesture library 238 may indicate that a single stroke in a first category corresponds to a first gesture. For instance, an entry in gesture library 238 may indicate that a single stroke classified as tilt may correspond to a lift-and-look gesture. As another example, a second entry in gesture library 238 may indicate that a particular sequence of motion strokes in a respective sequence of categories corresponds to a second gesture. For instance, an entry in gesture library 238 may indicate that a first stroke classified as twist-away (e.g., the user supinates their hand) followed by a second stroke classified as twist-toward (e.g., the user pronates their hand) may correspond to a wrist flick gesture In some examples, each respective entry in gesture library 238 may indicate one or more actions associated with the respective gesture. For instance, an entry for the look-and-lift gesture may indicate actions of transitioning one or more components of wearable computing device 202 from a low power mode to a higher power mode.

One or more storage devices 260 within wearable computing device 202 may store information for processing during operation of wearable computing device 202 (e.g., wearable computing device 202 may store data that modules 242 and 244 and operating system 246 may access during execution at wearable computing device 202). In some examples, storage device 260 is a temporary memory, meaning that a primary purpose of storage device 260 is not long-term storage. Storage devices 260 on wearable computing device 202 may configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 260, in some examples, also include one or more computer-readable storage media. Storage devices 260 may store larger amounts of information than volatile memory. Storage devices 260 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 260 may store program instructions and/or information (e.g., data) associated with application modules 242, UIM 244, and operating system 246.

Operating system 246, in some examples, controls the operation of components of wearable computing device 202. For example, operating system 246, in one example, facilitates the communication of application modules 242 with application processors 210, one or more input components 248, one or more output components 250, presence-sensitive display 256, and SCM 204. Each of application modules 242 may include program instructions and/or data that are executable by wearable computing device 202 (e.g., by one or more application processors 210).

UIM 244 may cause presence-sensitive display 256 to output a graphical user interface (e.g., graphical user interfaces 120A, 120B of FIG. 1) for display, which may enable a user of wearable computing device 202 to view output and/or provide input at presence-sensitive input component 258. UIM 244 and presence-sensitive display 256 may receive one or more indications of input from a user as the user interacts with the graphical user interface, at different times and when the user and wearable computing device 202 are at different locations. UIM 244 and presence-sensitive input component 258 may interpret inputs detected at presence-sensitive input component 258 (e.g., as a user provides one or more gestures at one or more locations of presence-sensitive display 256 at which the graphical user interface is displayed) and may relay information about the inputs detected at presence-sensitive input component 258 to one or more associated platforms, operating systems, applications, and/or services executing at wearable computing device 202, to cause wearable computing device 202 to perform functions.

UIM 244 may receive information and instructions from one or more associated platforms, operating systems, applications, and/or services executing at wearable computing device 202 (e.g., application modules 242) for generating a graphical user interface. In addition, UIM 244 may act as an intermediary between the one or more associated platforms, operating systems, applications, and/or services executing at wearable computing device 202 and various output devices of wearable computing device 202 (e.g., speakers, LED indicators, audio or electrostatic haptic output device, etc.) to produce output (e.g., a graphic, a flash of light, a sound, a haptic response, etc.) with wearable computing device 202.

Battery 252 may provide power to one or more components of wearable computing device 202. Examples of battery 252 may include, but are not necessarily limited to, batteries having zinc-carbon, lead-acid, nickel cadmium (NiCd), nickel metal hydride (NiMH), lithium ion (Li-ion), and/or lithium ion polymer (Li-ion polymer) chemistries. Battery 252 may have a limited capacity (e.g., 1000-3000 mAh).

Modules 226, 228, 230, 232, 234, 236, 242, and 244 may perform operations described herein using software, hardware, firmware, or any combination of hardware, software, and firmware residing in and executing on wearable computing device 202. Wearable computing device 202 may execute modules 226, 228, 230, 232, 234, 236, 242, and 244 with multiple processors. Wearable computing device 202 may execute any of modules 226, 228, 230, 232, 234, 236, 242, and 244 as or within a virtual machine executing on underlying hardware. Modules 226, 228, 230, 232, 234, 236, 242, and 244 may be implemented in various ways. For example, any of modules 226, 228, 230, 232, 234, 236, 242, and 244 may be implemented as a downloadable or pre-installed application or "app." In another example, any of modules 226, 228, 230, 232, 234, 236, 242, and 244 may be implemented as part of an operating system of wearable computing device 202.

Due to the limited capacity, the period of time for which wearable computing device 202 may operate with power provided by battery 252 may be based on the amount of power consumed by wearable computing device 202. As such, in order to increase the period of time for which wearable computing device 202 may operate with power provided by battery 252, it may be desirable to reduce the amount of power consumed by wearable computing device 202. As it may be undesirable to reduce performance while a user is interacting with (i.e., using) wearable computing device 202, it may be desirable to reduce the amount of power consumed by wearable computing device 202 while not in use by the user.

In accordance with one or more techniques of this disclosure, wearable computing device 202 may determine whether a user of wearable computing device 202 performed a gesture of a plurality of gestures based on motion data that represents movement of wearable computing device 202. As the user moves wearable computing device 202, a motion sensor of motion sensors 206 (e.g., an accelerometer) may generate motion data that represents the movement of wearable computing device 202 in the form of a plurality of motion vectors. In some examples, the motion sensor of motion sensors 206 may perform analysis on the plurality of motion vectors. For instance, where SCM 204 is operating in a low-power mode, a processor of accelerometer 231 may determine whether or not a value based on the plurality of motion vectors satisfies a threshold. Responsive to determining that the value satisfies the threshold, the motion sensor of motion sensors 206 may output a signal that causes SCM 204 to transition from operating in the low-power mode into a higher-power mode. In this way, the motion sensor of motion sensors 206 may reduce the amount of power consumed by SCM 204. For instance, by performing a preliminary analysis of the motion data, the processor of accelerometer 231 may allow SCM 204 to avoid continually analyzing the raw motion data. In any case, the motion sensor of motion sensors 206 may output the plurality of motion vectors to SCM 204.

Filtering module 226 of SCM 204 may filter the plurality of motion vectors to determine a plurality of filtered motion vectors. For instance, filtering module 226 may remove higher-frequency components from the plurality of motion vectors.

Stroke module 228 may determine one or more motion strokes based on the filtered motion vectors. For instance, stroke module 228 may determine one or more local minima from the filtered motion vectors. The determined one or more local minima may represent either a starting boundary of a stroke or an ending boundary of a stroke. Stroke module 228 may process each of the one or more local minima to determine a corresponding stroke starting boundary, ending boundary, or both. In some examples, stroke module 228 may determine the one or more motion strokes based on motion data corresponding to each of a plurality of axes represented by the motion vectors (i.e., X, Y, and Z axes). In some examples, stroke module 228 may determine the one or more motion strokes based on motion data corresponding to a particular axis of the plurality of axes. For example, stroke module 228 may determine the one or more motion strokes based on motion data corresponding to the Y axis (e.g., $V_y$ values as illustrated in FIG. 1).

Stroke module 228 may determine whether the determined local minima correspond to a curvature or a plateau. For instance, to determine whether a particular local minima corresponds a curvature or plateau, stroke module 228 may determine a standard deviation for the particular local minima (e.g., based on surrounding motion vectors). If the standard deviation is greater than a threshold (e.g., 0.1 in accelerometer data per 40 sequential values, standard deviation of 2.5 in gravity per second, etc.), stroke module 228 may determine that the particular local minima corresponds to a curvature. If the standard deviation is less than the threshold (e.g., 0.1 in accelerometer data per 40 sequential values, standard deviation of 2.5 in gravity per second, etc.), stroke module 228 may determine that the particular local minima corresponds to a plateau.

If the particular local minima corresponds to a curvature, stroke module 228 may determine that the particular local minima is a starting boundary of a stroke (i.e., an upward stroke). Stroke module 228 may determine a corresponding ending boundary of the stroke. For instance, stroke module 228 may evaluate subsequent motion vectors to determine a motion vector corresponding to an edge with a low rate of change which may be used as the ending boundary for the stroke. In some examples, stroke module 228 may continue to evaluate subsequent motion vectors (i.e., motion vectors temporally after the motion vector used as the end boundary) to determine a motion vector corresponding to an edge with a high rate of change. Stroke module 228 may determine that the motion vector corresponding to the edge with a high rate of change is a starting boundary for another stroke (i.e., a downward stroke).

If the particular local minima corresponds to a plateau, stroke module 228 may evaluate subsequent motion vectors to determine a motion vector corresponding to an edge with a high rate of change. Stroke module 228 may determine that the motion vector corresponding to the edge with a high rate of change is a starting boundary for a stroke (i.e., a downward stroke). In some examples, stroke module 228 may discard stroke that do not satisfy one or more criteria (such as motion strokes with a change in magnitude less than a threshold change in magnitude).

Transform module 230 may generate task-specific motion data by converting the motion vectors corresponding to the one or more motion strokes into a task-specific coordinate system. In some examples, transform module 230 may convert the motion vectors into the task-specific coordinate system as follows, where $z\_t$ is a typical orientation of the gravity vector during user interactions with wearable computing device 202 (e.g., the orientation of the gravity vector while wearable computing device 202 is in orientation 116 as illustrated in FIG. 1, as one example $z\_t$, in the x,y,z coordinate system, may be [0.0, 0.66, 0.75]):

- $x\_t = \text{unit}([1-z\_t(0)z\_t(0), -z\_t(0)z\_t(1), -z\_t(0)z\_t(2)])$ (e.g., projection of the X axis (e.g., with reference to accelerometer 32) onto a plane orthogonal to $z\_t$, normalized to unit length
- $y\_t$ may be selected such that $\{x\_t, y\_t, z\_t\}$ is a right-handed orthonormal basis
- m=a motion vector, normalized to unit length
- $a = 2 * \text{angle}(m, z\_t)/pi$
- $m\_p = \text{unit}(m(1-\text{outer}(z\_t, z\_t))$ (e.g., m projected onto the plane orthogonal to $z\_t$ and extended to unit length)
- $u' = m\_p \cdot x\_t$ (projection of $m\_p$ onto $x\_t$)
- $v' = m\_p \cdot y\_t$ (projection of $m\_p$ onto $y\_t$)
- $u = a(u')$ if $a <= 1$; else $(2-a)(u')$
- $v = a(v')$ if $a <= 1$; else $(2-a)(v')$ The coordinates (u, v) as specified above cover the entire hemisphere around $z\_t$ (or alternatively the opposite hemisphere) without ambiguities or singularities. In some examples, "a" may be included for complete generality. The task-centric coordinates (a, u, v) may be such that:

- A "taskideal" orientation $m=z\_t$ maps to (a=0, u=0, v=0)
- The polar opposite orientation $m=z\_t$ maps to (a=2, u=0, v=0)
- Every m orthogonal to $z\_t$ maps to a=1 and a (u, v) with unit length
- [Nonambiguous] Every orientation m maps to one and only one (a, u, v)
- [Continuous] Any infinitesimal change in m is also infinitesimal in (a, u, v)

Attribute module 232 may generate a respective attribute vector for each respective stroke of the one or more motion strokes. For instance, attribute module 232 may generate an attribute vector for a particular stroke of the one or more motion strokes that includes one or more of: spatial attributes, temporal attributes, and relational attributes.

Some example spatial attributes which may be included in each respective attribute vector include, but are not limited to, a near orientation attribute may indicate an endpoint of the respective stroke closest to a particular orientation, such as the task-specific orientation; a far orientation attribute that may indicate an endpoint of the respective stroke furthest from the particular orientation, such as the task-specific orientation; a polarity attribute that may indicate whether the respective stroke was from the far orientation to the near orientation or vice versa; an azimuth attribute that may indicate directionality of the respective stroke, such as the direction of the respective stroke's temporal derivative at the endpoint of the respective stroke closest to the particular orientation, or a pre-defined linear combination of the temporal derivative directions along the entire stroke, which, in some examples, may be biased toward the endpoint of the respective stroke closest to a particular orientation; and an amplitude attribute which may indicate a distance, such as a geodesic distance, between the endpoints of the respective stroke (i.e., a distance between the endpoint of the respective stroke furthest from the particular orientation and the endpoint of the respective stroke closest to the particular orientation).

Some example temporal attributes which may be included in each respective attribute vector include, but are not limited to, a duration attribute which may indicate a duration of the stroke, a start time attribute which may indicate a start time of the stroke, and an end time attribute which may indicate an end time of the stroke.

Some example relational attributes which may be included in each respective attribute vector include, but are not limited to, a periodicity attribute which may indicate the presence or absence of other motion strokes with similar properties at regular intervals (e.g., within a relatively small temporal neighborhood, such as the previous 5, 10, 20 motion strokes, of the respective stroke), and an anomaly attribute which may indicate the presence or absence of other motion strokes with similar properties within a history of measurements (e.g., a history of measurements collected from the current user of wearable computing device 202, a history of measurements collected from other users of wearable computing device 202, a history of measurements collected from users of other wearable computing devices, or any combination of the same).

In any case, classification module 234 may classify each respective stroke of the one or more motion strokes into at least one category based on respective corresponding attribute vectors received from attribute module 232. As one example, classification module 234 may classify each respective stroke using a binary classifier, such as standard Support Vector Machines (SVMs). For instance, when classifying a stroke as tilt or non-tilt, classification module 234 may use a binary classifier to classify each respective stroke as either tilt or non-tilt.

As another example, classification module 234 may classify each respective stroke based on a distance function between respective attribute vectors of the motion strokes. For instance, classification module 234 may train a distance function between stroke attribute vectors and cluster the motion strokes according to the distance function. Classifying motion strokes based on the distance function may have the advantage of picking up "natural" stroke classes that users perform when they are wearing wearable computing devices. For instance, gestures may be designed to match the natural classes. In some examples, classification may initially be performed with a basic attribute space and used to bootstrap a richer attribute space. For instance, classification may be initially performed without one or more attributes (e.g., the periodicity attribute and/or the anomaly attribute). In this way, classification module 234 may be trained over time to classify motion strokes into new categories.

As another example, classification module 234 may classify each respective stroke using deep belief networks (DBNs). For instance, classification module 234 may use training data that includes data triplets of motion strokes {A, B, C} such that the A and B are semantically much closer than either one of them and C. Classification module 234 may use the raw signals (e.g., motion data unfiltered by filtering module 226) as input to the DBNs (e.g., in a fixed temporal window). However, in some examples, using raw signals may use a large amount of data. In some examples, the input to the DBNs may include positive samples and/or negative samples. A positive sample may be a sample where the signals belong to a "desired" category (e.g., if we are classifying "tilt" vs "non-tilt" gestures the positive samples are the collected signals for an actual tilt). Conversely, negative samples may be samples that are non in the "desired" category (in the example below, those would be the non-tilt gestures). In some examples, classification module 234 may use random windows of the negative samples. In some examples, classification module 234 may apply various transformations to the positive samples (where the positive samples may be invariant to the transformations).

In any case, gesture module 236 may determine whether or not the user has performed (or is performing) a gesture based on the respective categories for the one or more motion strokes. For instance, gesture module 236 may search gesture library 238 to determine whether or not the respective categories for the respective one or more motion strokes correspond to one or more entries in gesture library 238. Responsive to determining that the respective categories for the respective one or more motion strokes correspond to a particular entry in gesture library 238, gesture module 236 may determine that the user has performed a gesture corresponding to the particular entry and cause wearable computing device 202 to perform an action indicated by the particular entry.

For instance, rather than requiring the user to provide additional input to cause application processor 210 and/or display component 208 to transition from operating in a low-power mode to operating in a higher-power mode, responsive to determining that the user has perform a gesture to view wearable computing device 202 (e.g., a lift-and-look gesture), gesture module 236 may send an interrupt signal to application processor 210 that causes application processor 210 to transition from operating in a low-power mode to operating in a higher-power mode.

Responsive to transition from operating in the low-power mode to operating in the higher-power mode, application processor 210 may send a signal to display component 208 that causes display component 208 to output a GUI, such as GUI 120B of FIG. 1. As another example, gesture module 236 may send a signal to display component 208 that causes display component 208 to activate (e.g., turn on).

Figure 3A:
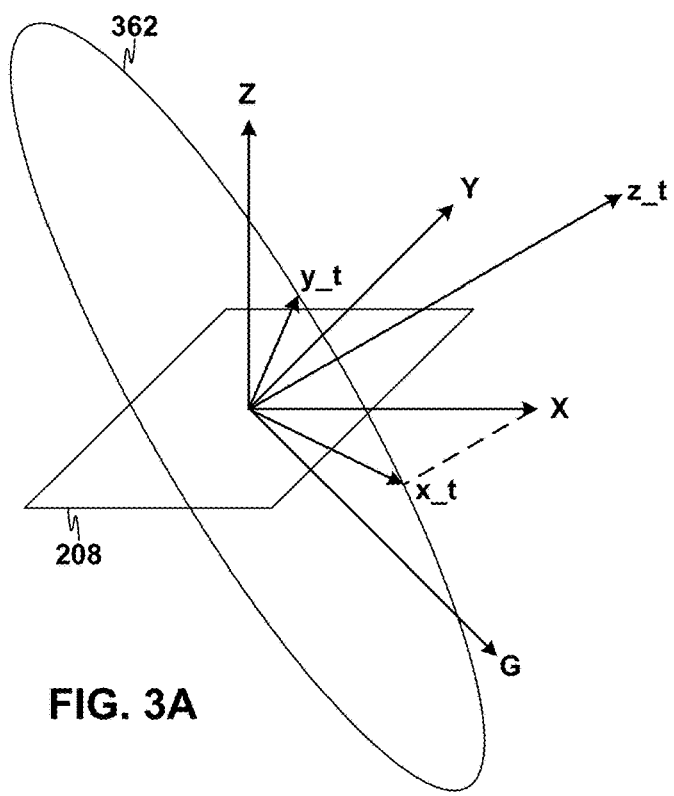
FIGS. 3A and 3B are conceptual diagrams illustrating conversion of coordinates from a first coordinate system into a second, task-specific, coordinate system, in accordance with one or more techniques of the present disclosure.
Figure 3B:
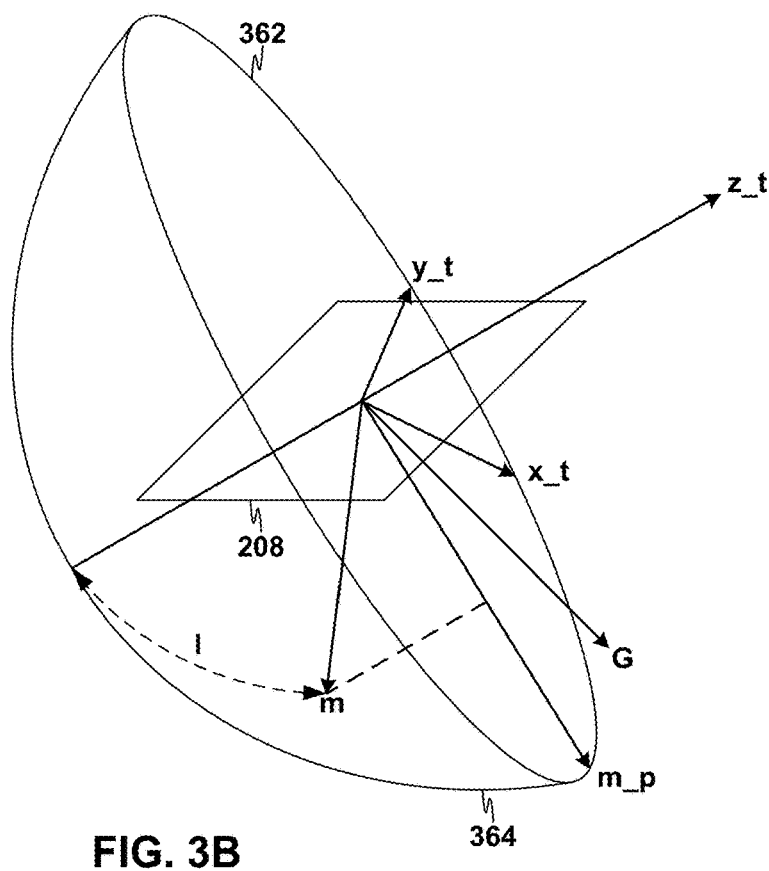

FIGS. 3A and 3B are conceptual diagrams illustrating conversion of motion data from a first coordinate system into a second, task-specific, coordinate system, in accordance with one or more techniques of the present disclosure. As illustrated by FIG. 3A, X, Y, and Z may represent the X, Y, and Z axes of a motion sensor included in a wearable device, such as an accelerometer 231 of motion sensors 206 of wearable computing device 202 of FIG. 2. Also as illustrated in FIG. 3A, the Z axis may be normal to the surface of a display of wearable computing device 202 (e.g., display component 208), the Y axis may be parallel to the vertical dimension of the display, and the X axis may be parallel to the horizontal dimension of the display.

In accordance with one or more techniques of this disclosure, a wearable computing device, such as wearable computing device 202, may convert motion data from a first coordinate system into a second, task-specific, coordinate system. As one example, transform module 230 may convert motion data generated by a motion sensor of motion sensors 206 (e.g., an accelerometer 231) into a gaze-centric coordinate system. The vector $z\_t$ may be defined as the typical orientation of gravity vector G while a user is expected to be interacting with wearable computing device 202 (i.e., while the user is "gazing" at a display of wearable computing device 202). Based on $z\_t$, the vectors $x\_t$ and $y\_t$ may be defined. For instance, the vector $x\_t$ may be defined by projecting the X axis onto a plane orthogonal to $z\_t$ (circle 362 may be a circle of unit length on the plane centered at $x\_t=y\_t=z\_t=0$), and the vector $y\_t$ may be selected to be a vector orthogonal to $z\_t$ and $x\_t$ (e.g., such that $x\_t$, $y\_t$, and $z\_t$ form a right-handed orthonormal system).

In operation, transform module 230 may convert motion vectors including x,y,z values (corresponding to the X, Y, and Z axes) into u,v coordinates. Transform module 230 may normalize the x,y,z values of a motion vector into unit length to determine motion vector m. Transform module 230 may determine vector motion vector $m\_p$ by projecting motion vector m on to a plane of display component 208 and extending the result to unit length (i.e., to intersect with circle 362). Transform module 230 may determine u', an intermediate value for the u coordinate, by projecting motion vector $m\_p$ onto $x\_t$ (i.e., $u'=m\_p \cdot x\_t$), and v', an intermediate value for the v coordinate, by projecting motion vector $m\_p$ onto $y\_t$ (i.e., $v'=m\_p \cdot y\_t$). As illustrated in FIG. 3B, transform module 230 may determine an l value as the distance (e.g., the geodesic distance) between m and the nearest intersection of $z\_t$ and a sphere centered at $x\_t=y\_t=z\_t=0$ (i.e., the sphere that includes hemisphere 364 and the complimentary hemisphere). Transform module 230 may determine the u,v coordinates by scaling the intermediate coordinates by the determined l value (i.e., $u=l*u'$ and $v=l*v'$). In this way, transform module 230 may convert motion vectors into a task-specific (e.g., a gaze-centric) coordinate system.

Figure 4:
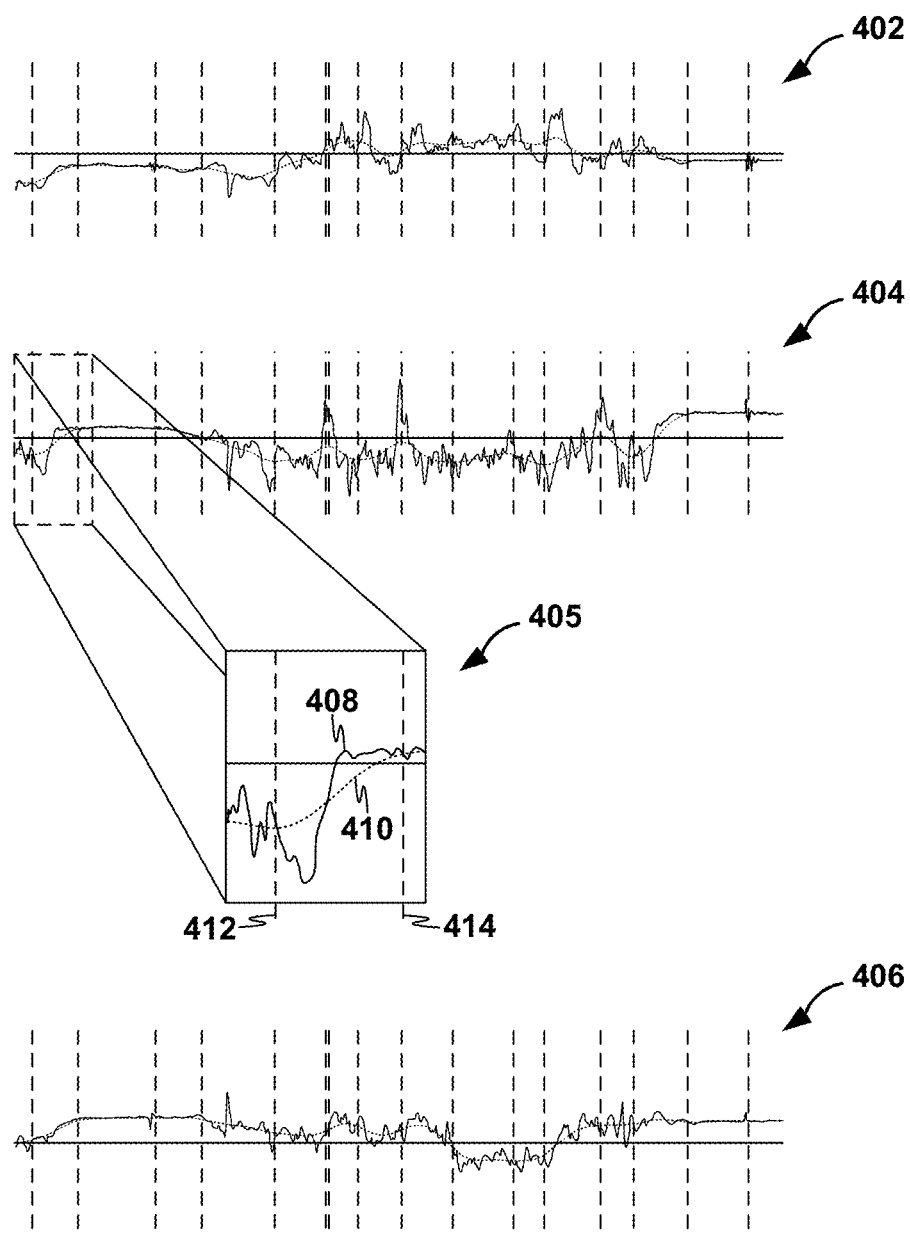
FIG. 4 is a graph illustrating example motion data generated by a motion sensor of a wearable computing device as a function of time, in accordance with one or more techniques of the present disclosure.

FIG. 4 is a graph illustrating example motion data generated by a motion sensor of a wearable computing device as a function of time, in accordance with one or more techniques of the present disclosure. In some examples, the motion data illustrated by graph 402 of FIG. 4 may correspond to X-axis motion data, the motion data illustrated by graph 404 of FIG. 4 may correspond to Y-axis motion data, and the motion data illustrated by graph 406 of FIG. 4 may correspond to Z-axis motion data generated by an accelerometer 131 of the one or more motion sensors 106 of wearable computing device 102 of FIG. 1 or an accelerometer 231 of the one or more motion sensors 206 of wearable computing device 202 of FIG. 2.

In accordance with one or more techniques of this disclosure, wearable computing device 202 may determine one or more motion strokes based on motion data generated by a an accelerometer of wearable computing device 202. For instance, as illustrated in expanded view 405 of graph 404, an accelerometer 231 of the one or more motion sensors 206 may generate Y-axis motion data 408, which may include a sequence of values. Filtering module 226 may filter Y-axis motion data 408 to generate filtered Y-axis motion data 410. Stroke module 228 of SCM 204 may determine the one or more motion strokes based on filtered Y-axis motion data 410. For instance, stroke module 228 may determine that the value of filtered Y-axis motion data 410 corresponding to time 412 is a local minima. Stroke module 228 may determine whether the local minima corresponds to a curvature or a plateau of filtered Y-axis motion data 410. For instance, stroke module 228 may determine that the local minima corresponds to a curvature where a standard deviation of values of filtered Y-axis motion data 410 temporally surrounding the local minima is greater than a threshold.

In any case, responsive to determining that the local minima corresponds to a curvature, stroke module 228 may determine that the local minima is a starting boundary of a stroke, such as an upward stroke. Stroke module 228 may evaluate values of filtered Y-axis motion data 410 subsequent to time 412 to determine a value corresponding to an edge of filtered Y-axis motion data 410, such as an edge with a low rate of change. For instance, stroke module 228 may determine that the value of filtered Y-axis motion data 410 corresponding to time 414 is an edge. Stroke module 228 may determine that the value of filtered Y-axis motion data 410 corresponding to time 414 is an ending boundary of the stroke. In this way, stroke module 228 may determine one or more motion strokes based on motion data generated by a motion sensor of wearable computing device 202 based on features of the filtered motion data.

As discussed above, stroke module 228 may output an indication of the determined one or more motion strokes to attribute module 232, which may generate a respective attribute vector for each stroke of the one or more stokes.

Figure 5:
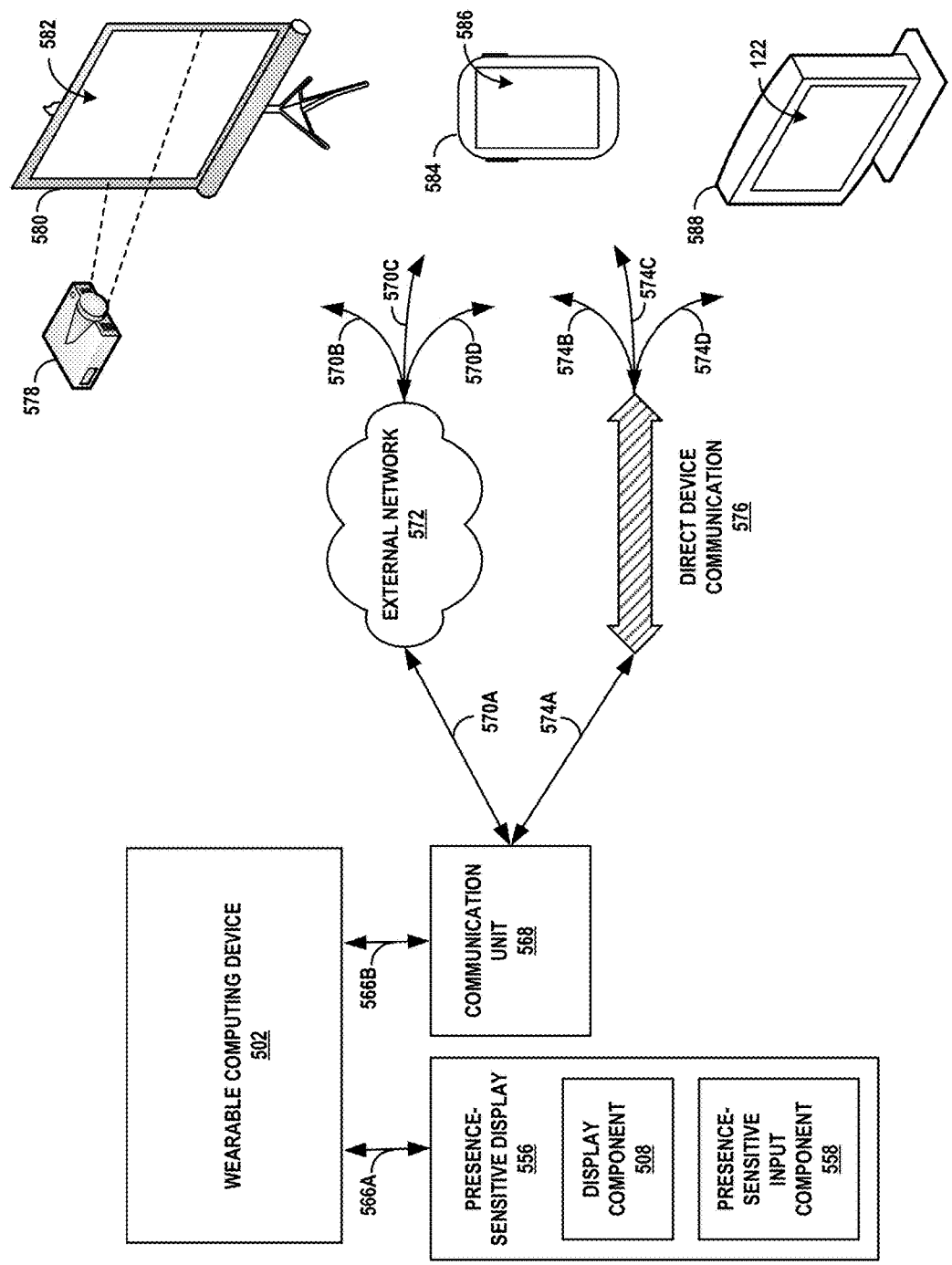
FIG. 5 is a block diagram illustrating an example computing device that outputs graphical content for display at a remote device, in accordance with one or more techniques of the present disclosure.

FIG. 5 is a block diagram illustrating an example computing device that outputs graphical content for display at a remote device, in accordance with one or more techniques of the present disclosure. Graphical content, generally, may include any visual information that may be output for display, such as text, images, a group of moving images, etc. The example shown in FIG. 5 includes a computing device 502, presence-sensitive display 556, communication unit 568, projector 578, projector screen 580, mobile device 584, and visual display device 588. Although shown for purposes of example in FIGS. 1 and 2 as stand-alone wearable computing device 104/204, a computing device, such as computing device 502 may, generally, be any component or system that includes a processor or other suitable computing environment for executing software instructions and, for example, need not include a presence-sensitive display.

As shown in the example of FIG. 5, computing device 502 may be a processor that includes functionality as described with respect to application processor 210 or SCM 204 in FIG. 2. In such examples, computing device 502 may be operatively coupled to presence-sensitive display 556 by a communication channel 566A, which may be a system bus or other suitable connection. Computing device 502 may also be operatively coupled to communication unit 568, further described below, by a communication channel 566B, which may also be a system bus or other suitable connection. Although shown separately as an example in FIG. 5, computing device 502 may be operatively coupled to presence-sensitive display 556 and communication unit 568 by any number of one or more communication channels.

In other examples, such as illustrated previously by wearable computing device 102/202 in FIGS. 1 and 2, a computing device may refer to a portable or mobile device such as mobile phones (including smart phones), wearable computing devices (including smart watches and headsets) laptop computers, etc.

Presence-sensitive display 556, like presence-sensitive display 256 of FIG. 2, may include display component 508 and presence-sensitive input component 558. Display component 508 may, for example, receive data from computing device 502 and display the graphical content. In some examples, presence-sensitive input component 558 may determine one or more user inputs (e.g., continuous gestures, multi-touch gestures, single-touch gestures, etc.) at presence-sensitive display 556 using capacitive, inductive, and/or optical recognition techniques and send indications of such user input to computing device 502 using communication channel 566A. In some examples, presence-sensitive input component 558 may be physically positioned on top of display component 508 such that, when a user positions an input unit over a graphical element displayed by display component 508, the location at which presence-sensitive input component 558 corresponds to the location of display component 508 at which the graphical element is displayed. In other examples, presence-sensitive input component 558 may be positioned physically apart from display component 508, and locations of presence-sensitive input component 558 may correspond to locations of display component 508, such that input can be made at presence-sensitive input component 558 for interacting with graphical elements displayed at corresponding locations of display component 508.

As shown in FIG. 5, computing device 502 may also include and/or be operatively coupled with communication unit 568. Examples of communication unit 568 may include a network interface card, an Ethernet card, an optical transceiver, a radio frequency transceiver, or any other type of device that can send and receive information. Other examples of such communication units may include Bluetooth, 3G, and Wi-Fi radios, Universal Serial Bus (USB) interfaces, etc. Computing device 502 may also include and/or be operatively coupled with one or more other devices, e.g., input devices, output devices, memory, storage devices, etc. that are not shown in FIG. 5 for purposes of brevity and illustration.

FIG. 5 also illustrates a projector 578 and projector screen 580. Other such examples of projection devices may include electronic whiteboards, holographic display devices, and any other suitable devices for displaying graphical content. Projector 578 and projector screen 580 may include one or more communication units that enable the respective devices to communicate with computing device 502. In some examples, the one or more communication units may enable communication between projector 578 and projector screen 580. Projector 578 may receive data from computing device 502 that includes graphical content. Projector 578, in response to receiving the data, may project the graphical content onto projector screen 580. In some examples, projector 578 may determine one or more user inputs (e.g., continuous gestures, multi-touch gestures, single-touch gestures, etc.) at projector screen using optical recognition or other suitable techniques and send indications of such user input using one or more communication units to computing device 502. In such examples, projector screen 580 may be unnecessary, and projector 578 may project graphical content on any suitable medium and detect one or more user inputs using optical recognition or other such suitable techniques.

Projector screen 580, in some examples, may include a presence-sensitive display 582. Presence-sensitive display 582 may include a subset of functionality or all of the functionality of display 108 as described in this disclosure. In some examples, presence-sensitive display 556 may include additional functionality. Projector screen 580 (e.g., an electronic whiteboard) may receive data from computing device 502 and display the graphical content. In some examples, presence-sensitive display 582 may determine one or more user inputs (e.g., continuous gestures, multi-touch gestures, single-touch gestures, etc.) at projector screen 580 using capacitive, inductive, and/or optical recognition techniques and send indications of such user input using one or more communication units to computing device 502.

FIG. 5 also illustrates mobile device 584 and visual display device 588. Mobile device 584 and visual display device 588 may each include computing and connectivity capabilities. Examples of mobile device 584 may include e-reader devices, convertible notebook devices, hybrid slate devices, wearable computing devices, etc. Examples of visual display device 588 may include other semi-stationary devices such as televisions, computer monitors, etc. As shown in FIG. 5, mobile device 584 may include a presence-sensitive display 586. Visual display device 588 may include a presence-sensitive display 590. Presence-sensitive displays 586, 590 may include a subset of functionality or all of the functionality of display 108 as described in this disclosure. In some examples, presence-sensitive displays 586, 590 may include additional functionality. In any case, presence-sensitive display 590, for example, may receive data from computing device 502 and display the graphical content. In some examples, presence-sensitive display 590 may determine one or more user inputs (e.g., continuous gestures, multi-touch gestures, single-touch gestures, etc.) at projector screen using capacitive, inductive, and/or optical recognition techniques and send indications of such user input using one or more communication units to computing device 502.

As described above, in some examples, computing device 502 may output graphical content for display at presence-sensitive display 556 that is coupled to computing device 502 by a system bus or other suitable communication channel. Computing device 502 may also output graphical content for display at one or more remote devices, such as projector 578, projector screen 580, mobile device 584, and visual display device 588. For instance, computing device 502 may execute one or more instructions to generate and/or modify graphical content in accordance with techniques of the present disclosure. Computing device 502 may output the data that includes the graphical content to a communication unit of computing device 502, such as communication unit 568. Communication unit 568 may send the data to one or more of the remote devices, such as projector 578, projector screen 580, mobile device 584, and/or visual display device 588. In this way, computing device 502 may output the graphical content for display at one or more of the remote devices. In some examples, one or more of the remote devices may output the graphical content at a presence-sensitive display that is included in and/or operatively coupled to the respective remote devices.

In some examples, computing device 502 may not output graphical content at presence-sensitive display 556 that is operatively coupled to computing device 502. In other examples, computing device 502 may output graphical content for display at both a presence-sensitive display 556 that is coupled to computing device 502 by communication channel 566A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 502 and output for display at presence-sensitive display 556 may be different than graphical content display output for display at one or more remote devices.

Computing device 502 may send and receive data using any suitable communication techniques. For example, computing device 502 may be operatively coupled to external network 572 using network link 570A. Each of the remote devices illustrated in FIG. 4 may be operatively coupled to network external network 572 by one of respective network links 570B, 570C, and 570D. External network 572 may include network hubs, network switches, network routers, etc., that are operatively inter-coupled thereby providing for the exchange of information between computing device 502 and the remote devices illustrated in FIG. 5. In some examples, network links 570A-570D may be Ethernet, ATM or other network connections. Such connections may be wireless and/or wired connections.

In some examples, computing device 502 may be operatively coupled to one or more of the remote devices included in FIG. 5 using direct device communication 576. Direct device communication 576 may include communications through which computing device 502 sends and receives data directly with a remote device, using wired or wireless communication. That is, in some examples of direct device communication 576, data sent by computing device 502 may not be forwarded by one or more additional devices before being received at the remote device, and vice-versa. Examples of direct device communication 576 may include Bluetooth, Near-Field Communication, Universal Serial Bus, Wi-Fi, infrared, etc. One or more of the remote devices illustrated in FIG. 5 may be operatively coupled with computing device 502 by communication links 574A-574D. In some examples, communication links 574A-574D may be connections using Bluetooth, Near-Field Communication, Universal Serial Bus, infrared, etc. Such connections may be wireless and/or wired connections.

In accordance with techniques of the disclosure, computing device 502 may be operatively coupled to visual display device 588 using external network 572. A sensor control module of computing device 502 may determine, based on motion data generated by a motion sensor, a plurality of values. Responsive to determining that each the plurality of values satisfies a corresponding threshold, computing device 502 may send a signal to a display that causes the display to transition from operating in a low-power mode to operating in a higher-power mode. For example, computing device 502 may a signal to display component 508 of presence-sensitive display 556, projector 578, presence-sensitive display 586 of mobile device 584, and/or presence-sensitive display 590 of visual display device 588 that causes display component 508 of presence-sensitive display 556, projector 578, presence-sensitive display 586 of mobile device 584, and/or presence-sensitive display 590 of visual display device 588 to transition from operating in a low-power mode to operating in a higher-power mode.

Figure 6:
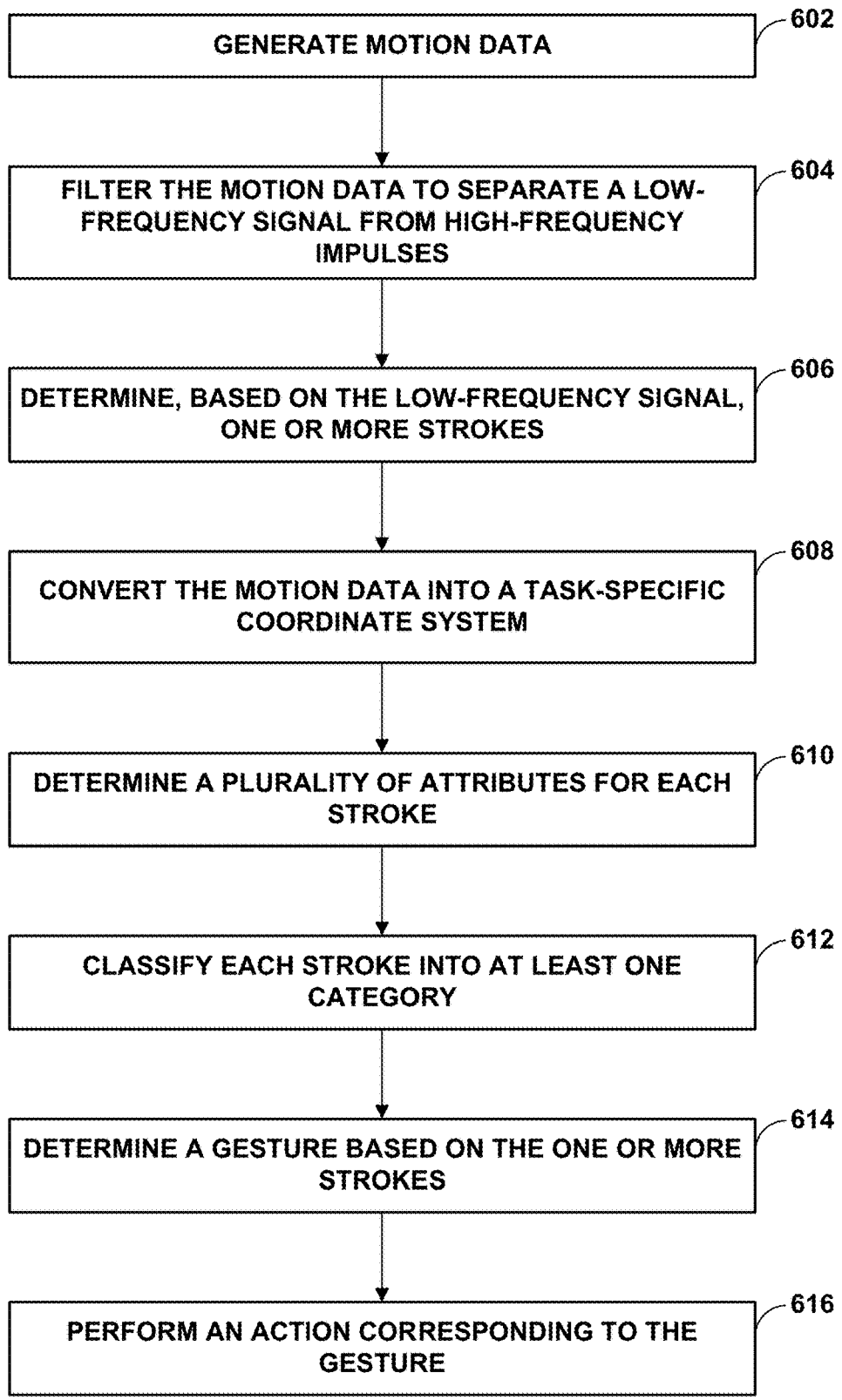
FIG. 6 is a flow diagram illustrating example operations of a wearable computing device that performs actions based on motion data, in accordance with one or more techniques of the present disclosure.

FIG. 6 is a flow diagram illustrating example operations of a wearable computing device that performs actions based on motion data, in accordance with one or more techniques of the present disclosure. The techniques of FIG. 6 may be performed by one or more processors of a computing device, such as wearable computing device 102 or 202 illustrated in FIG. 1 and FIG. 2. For purposes of illustration, the techniques of FIG. 6 are described within the context of wearable computing device 202 of FIG. 2, although computing devices having configurations different than that of wearable computing device 202 may perform the techniques of FIG. 6, such as wearable computing device 102 of FIG. 1.

In accordance with one or more techniques of the disclosure, one or more of motion sensor of sensors 206 may generate motion data (602). For instance, an accelerometer 231 of motion sensors 206 may generate a plurality of motion vectors that each indicate a respective acceleration value for an X-axis, a Y-axis, and a Z-axis. The motion data generated by the motion sensor of motion sensors 206 indicates movement of wearable computing device 202, such as movement of wearable computing device 202 during a first time period. In some examples, one or more components of wearable computing device 202, such as application processors 210 and/or presence-sensitive display 256, operate in a low power mode during the first time period. In general, application processors 210 and/or presence-sensitive display 256 consume less power while operating in the low power mode than while operating in a higher power mode.

One or more of processors 222 of SCM 204 may filter the motion data (604). For instance, the one or more of processors 222 may execute filtering module 226 to filter the motion data to separate a low-frequency signals from high-frequency impulses.

One or more of processors 222 may determine, based on the low-frequency signal, one or more motion strokes (606). For instance, the one or more of processors 222 may execute stroke module 228 to determine the one or more motion strokes based on features of the low-frequency signal, such as local minima and edges.

One or more of processors 222 may convert the motion data into a task-specific coordinate system (608). In some examples, such as where the task is based on a "gaze" of the user (i.e., the direction of the user's field of view), the task-specific coordinate system may be a gaze-centric coordinate system. For instance, the one or more of processors 222 may execute transform module 230 to convert the motion data into a gaze-centric coordinate system as discussed above with reference to FIG. 2. In some examples, transform module 230 may covert all of the motion data into the task-specific coordinate system. In some examples, transform module 230 may covert a portion of the motion data into the task-specific coordinate system. For instance, transform module 230 may convert portions of the motion data associated with the one or more motion strokes into the task-specific coordinate system.

One or more of processors 222 may determine a plurality of attributes for each stroke (610). For instance, the one or more of processors 222 may execute attribute module 232 to determine a respective attribute vector for each respective stroke of the one or more motion strokes. In some examples, attribute module 232 may determine an attribute vector for a stroke based on the motion data in the task-specific coordinate system.

One or more of processors 222 may classify each stroke into at least one category (612) based on its attribute vector. For instance, the one or more of processors 222 may execute classification module 234 to classify each respective stroke from the one or more motion strokes into at least one category such as "tilt", "non-tilt", or other categories.

One or more of processors 222 may determine a gesture based on the one or more motion strokes (614). For instance, the one or more of processors 222 may execute gesture module 236 to determine a gesture based on a gesture library, such as gesture library 238, and the at least one category for each stroke from the one or more motion strokes.

One or more of processors 222 may perform an action corresponding to the gesture (616). For instance, where the gesture determined by gesture module 236 is a lift-and-look gesture, the one or more of processors 222 may cause at least one of the one or more components to transition from operating in a low-power mode to operating in a higher-power mode. In some examples, the one or more of processors 222 may cause at least one of the one or more components to transition from operating in the low-power mode to operating in the higher-power mode by outputting an interrupt to application processor 210 and/or presence-sensitive display 256 that causes application processor 210 and/or presence-sensitive display 256 to transition from operating in a low-power mode to operating in a higher power operating mode.

Example 1

A method comprising: determining, by a processor of a wearable computing device and based on motion data generated by a motion sensor of the wearable computing device, one or more strokes; generating, by the processor and based on the motion data, a respective attribute vector for each respective stroke from the one or more strokes; classifying, by the processor and based on the respective attribute vector, each respective stroke from the one or more strokes into at least one category; determining, by the processor and based on a gesture library and the at least one category for each stroke from the one or more strokes, a gesture; and performing, by the wearable device and based on the gesture, an action.

Example 2

The method of example 1, further comprising: generating task-specific motion data by at least converting the motion data into a task-specific coordinate system; and determining, based on a task-specific coordinate system and the task-specific motion data, an orientation of the wearable device relative to a gravity vector, wherein determining the gesture is further based on the orientation of the wearable device.

Example 3

The method of any combination of examples 1-2, wherein: the wearable computing device is operating in a first power mode while the motion sensor generates the motion data, the orientation of the wearable device indicates that a user of the wearable device is viewing a display of the wearable device, the gesture comprises a lift-and-look gesture, and performing the action comprises transitioning, by the wearable device, a display of the wearable device from operating in the first power mode to operating in a second power mode, wherein the display uses less power while operating in the first power more than while operating in the second power mode.

Example 4

The method of any combination of examples 1-3, further comprising: generating, by the motion sensor of the wearable computing device, the motion data; responsive to determining, by a processor of the motion sensor that is different than the processor of the wearable computing device, that the motion data satisfies one or more thresholds, outputting the motion data to the processor of the wearable computing device.

Example 5

The method of any combination of examples 1-4, wherein the wearable computing device includes an application processor that is different than the processor of the wearable computing device and the processor of the motion sensor.

Example 6

The method of any combination of examples 1-5, wherein classifying each stroke from the plurality of stokes comprises classifying each stroke into a binary classification using support vector machines.

Example 7

The method of any combination of examples 1-6, wherein classifying each stroke from the plurality of strokes comprises: classifying, by the processor and based on a distance function between feature vectors of each stroke from the plurality of strokes, each stroke from the plurality of strokes into the at least one category.

Example 8

The method of any combination of examples 1-7, wherein classifying each stroke from the plurality of strokes comprises: classifying, by the processor and using deep belief networks, each stroke from the plurality of strokes.

Example 9

The method of any combination of examples 1-8, wherein the motion data includes a sequence of values, and wherein determining the one or more strokes comprises: determining a local minimum value within a neighborhood of the sequence of values; and responsive to determining that the local minimum value corresponds to a curvature of the motion data: determining that the local minimum value is a starting boundary of a stroke of the one or more strokes; evaluating subsequent values within the sequence of values to determine a value corresponding to an edge of the motion data; and determining that the value corresponding to the edge is an ending boundary of the stroke.

Example 10

The method of any combination of examples 1-9, wherein the stroke is a first stroke of the one or more strokes, wherein the edge is a first edge, the method further comprising: responsive to determining that the value that corresponds to the first edge is an ending boundary of the stroke: evaluating subsequent values within the sequence of values to determine a value corresponding to a second edge of the motion data; and determining that the value corresponding to the second edge is an starting boundary of a second stroke.

Example 11

A wearable computing device comprising one or more processors; a motion sensor; and at least one module executable by the one or more processors to perform the method of any combination of examples 1-10.

Example 12

A wearable computing device comprising means for performing the method of any combination of examples 1-10.

Example 13

A non-transitory computer-readable storage medium storing instruction that, when executed, cause one or more processors of a wearable computing device to perform the method of any combination of examples 1-10.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method comprising:
   determining, by a processor of a wearable computing device and based on motion data generated by a motion sensor of the wearable computing device, one or more strokes, wherein the one or more strokes are determined by segmenting the motion data based on the features of the motion data;
   generating, by the processor and based on the motion data, a respective attribute vector for each respective stroke from the one or more strokes;
   classifying, by the processor and based on the respective attribute vector, each respective stroke from the one or more strokes into at least one category;
   determining, by the processor and based on a gesture library and the at least one category for each stroke from the one or more strokes, a gesture; and
   performing, by the wearable device and based on the gesture, an action.

2. The method of claim 1, further comprising:
   generating task-specific motion data by at least converting the motion data into a task-specific coordinate system; and
   determining, based on a task-specific coordinate system and the task-specific motion data, an orientation of the wearable device relative to a gravity vector,
   wherein determining the gesture is further based on the orientation of the wearable device.

3. The method of claim 2, wherein:
   the wearable computing device is operating in a first power mode while the motion sensor generates the motion data,
   the orientation of the wearable device indicates that a user of the wearable device is viewing a display of the wearable device,
   the gesture comprises a lift-and-look gesture, and
   performing the action comprises transitioning, by the wearable device, a display of the wearable device from operating in the first power mode to operating in a second power mode, wherein the display uses less power while operating in the first power more than while operating in the second power mode.

4. The method of claim 1, further comprising:
   generating, by the motion sensor of the wearable computing device, the motion data;
   responsive to determining, by a processor of the motion sensor that is different than the processor of the wearable computing device, that the motion data satisfies one or more thresholds, outputting the motion data to the processor of the wearable computing device.

5. The method of claim 4, wherein the wearable computing device includes an application processor that is different than the processor of the wearable computing device and the processor of the motion sensor.

6. The method of claim 1, wherein classifying each stroke from the plurality of stokes comprises classifying each stroke into a binary classification using support vector machines.

7. The method of claim 1, wherein classifying each stroke from the plurality of strokes comprises:
   classifying, by the processor and based on a distance function between feature vectors of each stroke from the plurality of strokes, each stroke from the plurality of strokes into the at least one category.

8. The method of claim 1, wherein classifying each stroke from the plurality of strokes comprises:
   classifying, by the processor and using deep belief networks, each stroke from the plurality of strokes.

9. The method of claim 1, wherein the motion data includes a sequence of values, and wherein determining the one or more strokes comprises:
   determining a local minimum value within a neighborhood of the sequence of values; and
   responsive to determining that the local minimum value corresponds to a curvature of the motion data:
      determining that the local minimum value is a starting boundary of a stroke of the one or more strokes;
      evaluating subsequent values within the sequence of values to determine a value corresponding to an edge of the motion data; and
      determining that the value corresponding to the edge is an ending boundary of the stroke.

10. The method of claim 9, wherein the stroke is a first stroke of the one or more strokes, wherein the edge is a first edge, the method further comprising:
   responsive to determining that the value that corresponds to the first edge is an ending boundary of the stroke:
      evaluating subsequent values within the sequence of values to determine a value corresponding to a second edge of the motion data; and
      determining that the value corresponding to the second edge is a starting boundary of a second stroke.

11. A wearable computing device comprising:
   a motion sensor;
   one or more processors configured to:
      determine, based on motion data generated by a motion sensor of the wearable computing device, one or more strokes, wherein, to determine the one or more strokes, the one or more processors are configured to segment the motion data based on the features of the motion data;
      generate, based on the motion data, a respective attribute vector for each respective stroke from the one or more strokes;
      classify, based on the respective attribute vector, each respective stroke from the one or more strokes into at least one category;
      determine, based on a gesture library and the at least one category for each stroke from the one or more strokes, a gesture; and
      perform, based on the gesture, an action.

12. The wearable computing device of claim 11, wherein the one or more processors are configured to:
   generate task-specific motion data by at least converting the motion data into a task-specific coordinate system;
   determine, based on a task-specific coordinate system and the task-specific motion data, an orientation of the wearable device relative to a gravity vector; and
   determine the gesture further based on the orientation of the wearable device.

13. The wearable computing device of claim 12, wherein:
the wearable computing device is operating in a first power mode while the motion sensor generates the motion data,
the orientation of the wearable device indicates that a user of the wearable device is viewing a display of the wearable device,
the gesture comprises a lift-and-look gesture, and
the one or more processors are configured to perform the action by at least transitioning, a display of the wearable device from operating in the first power mode to operating in a second power mode, wherein the display uses less power while operating in the first power more than while operating in the second power mode.

14. The wearable computing device of claim 11, wherein the motion sensor is associated with a processor of the one or more processors, and wherein the processor associated with the motion sensor is configured to:
receive the motion data generated by the motion sensor of the wearable computing device; and
responsive to determining that the motion data satisfies one or more thresholds, output the motion data to another processor of the one or more processors of wearable computing device.

15. The wearable computing device of claim 14, wherein the wearable computing device comprises an application processor that is different than the other processor of the wearable computing device and the processor associated with the motion sensor.

16. The wearable computing device of claim 11, wherein the one or more processors are configured to classify each stroke from the plurality of stokes by at least classifying each stroke into a binary classification using support vector machines.

17. The wearable computing device of claim 11, wherein the one or more processors are configured to classify each stroke from the plurality of strokes by at least:
classifying, based on a distance function between feature vectors of each stroke from the plurality of strokes, each stroke from the plurality of strokes into the at least one category.

18. The wearable computing device of claim 11, wherein the motion data includes a sequence of values, and wherein the one or more processors are configured to determine the one or more motion strokes by at least:
determining a local minimum value within a neighborhood of the sequence of values; and
responsive to determining that the local minimum value corresponds to a curvature of the motion data:
determining that the local minimum value is a starting boundary of a stroke of the one or more strokes;
evaluating subsequent values within the sequence of values to determine a value corresponding to an edge of the motion data; and
determining that the value corresponding to the edge is an ending boundary of the stroke.

19. The wearable computing device of claim 18, wherein the stroke is a first stroke of the one or more strokes, wherein the edge is a first edge, and wherein the one or more processors are configured to:
responsive to determining that the value that corresponds to the first edge is an ending boundary of the stroke:
evaluate subsequent values within the sequence of values to determine a value corresponding to a second edge of the motion data; and
determine that the value corresponding to the second edge is a starting boundary of a second stroke.

20. A non-transitory computer-readable storage medium storing instructions that, when executed, cause at least one processor of a wearable computing device to:
determine, based on motion data generated by a motion sensor of the wearable computing device, one or more strokes, wherein the one or more strokes are determined by segmenting the motion data based on the features of the motion data;
generate, based on the motion data, a respective attribute vector for each respective stroke from the one or more strokes;
classify, based on the respective attribute vector, each respective stroke from the one or more strokes into at least one category;
determine, based on a gesture library and the at least one category for each stroke from the one or more strokes, a gesture; and
perform an action based on the gesture.

* * * * *